(12) United States Patent
Zhang

(10) Patent No.: US 12,739,207 B2
(45) Date of Patent: Sep. 15, 2026

(54) DATA PACKET TRANSMISSION METHOD AND RELATED DEVICES

(71) Applicant: Tencent Technology (Shenzhen) Company Limited, Shenzhen (CN)

(72) Inventor: Zhuoyun Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 232 days.

(21) Appl. No.: 18/791,925

(22) Filed: Aug. 1, 2024

(65) Prior Publication Data

US 2024/0396845 A1 Nov. 28, 2024

Related U.S. Application Data

(63) Continuation of application No. PCT/CN2023/095045, filed on May 18, 2023.

(51) Int. Cl.

*H04L 47/2408* (2022.01)
*H04L 47/20* (2022.01)

(Continued)

(52) U.S. Cl.

CPC .......... *H04L 47/2408* (2013.01); *H04L 47/20* (2013.01); *H04L 47/32* (2013.01); *H04W 28/06* (2013.01)

(58) Field of Classification Search

CPC ..... H04L 47/2408; H04L 47/20; H04L 47/32; H04L 47/2441; H04W 28/06;

(Continued)

(56) References Cited

U.S. PATENT DOCUMENTS 10,887,944 B2 * 1/2021 Skog ........................ H04L 67/14
11,146,574 B2 * 10/2021 Muddu ............. G06F 16/24578

(Continued)

FOREIGN PATENT DOCUMENTS

CN 108306843 A 7/2018
CN 111148105 A 5/2020

(Continued)

OTHER PUBLICATIONS

International search report in International Application No. PCT/CN2023/095045, dated Aug. 28, 2023, 10 pages (with English Translation).

(Continued)

*Primary Examiner* — Mahendra R Patel
(74) *Attorney, Agent, or Firm* — Crowell & Moring LLP

(57) ABSTRACT

The present disclosure relates to a data packet transmission method and related devices. The method includes: obtaining quality of service profile information of a target service flow from a session management function network element, the quality of service profile information comprising a first data detection rule and a first processing rule, the first data detection rule comprising data packet set type internal identification information, the first processing rule comprising a processing rule corresponding to the data packet set type; receiving a data packet to be forwarded; determining whether to discard one or more data packets within the data packet set type according to the packet loss processing information in response to the data packet set type internal identification information of the data packet being matched with the first data detection rule; and determining data packets to be discarded within the data packet set type.

14 Claims, 12 Drawing Sheets

(51) Int. Cl.
*H04L 47/32* (2022.01)
*H04W 28/06* (2009.01)

(58) Field of Classification Search
CPC ..... H04W 28/02; H04W 28/24; H04W 76/12; H04W 28/0268
USPC .......................................................... 370/236
See application file for complete search history.

(56) References Cited

U.S. PATENT DOCUMENTS 11,533,643 B2 * 12/2022 Zhou ................. H04W 28/0268
11,678,216 B2 * 6/2023 Liu ................... H04W 28/0268 455/422.1
11,748,503 B1 * 9/2023 Patel ................... G06F 21/6218 726/28
11,750,523 B2 * 9/2023 Xu ...................... H04L 63/0236 709/224
11,777,861 B2 * 10/2023 Cañete .................... H04W 4/24 370/235
11,792,677 B2 * 10/2023 Liu ....................... H04W 12/03 370/230
11,936,545 B1 * 3/2024 Miskovic .............. H04L 41/142
12,022,319 B2 * 6/2024 Puente Pestañãet al. .................. H04W 28/0268
12,068,962 B2 * 8/2024 Zhang ..................... H04L 47/24
12,081,439 B2 * 9/2024 Jeong ...................... H04L 47/20
2020/0267753 A1 * 8/2020 Adjakple .......... H04W 72/1268
2021/0250771 A1 * 8/2021 Hu ........................ H04W 48/02
2021/0289390 A1 * 9/2021 Zhou ................. H04W 28/0933
2022/0109633 A1 * 4/2022 Li et al. .............. H04L 12/1407
2022/0330320 A1 * 10/2022 Adjakple .......... H04W 72/1268

FOREIGN PATENT DOCUMENTS

CN 112929257 A 6/2021
CN 114666279 A 6/2022
CN 112929257 B * 5/2023 ......... H04L 63/0807
WO WO-2008148422 A1 * 12/2008 ......... H04L 47/2408
WO WO-2018145669 A1 * 8/2018 ............ H04W 28/02
WO WO-2020063465 A1 * 4/2020 ............ H04W 40/22
WO WO-2020088598 A1 * 5/2020 ............. H04L 67/52
WO WO-2022036870 A1 * 2/2022 ............. H04L 69/22
WO WO-2022235199 A1 * 11/2022 ............ H04W 72/23
WO WO-2024032074 A1 * 2/2024 ............ H04W 28/06

OTHER PUBLICATIONS

3rd Generation Partnership Project; "Technical Specification Group Services and System Aspects; Study on XR (Extended Reality) and media services (Release 18)", Technical Report; 3GPP TR 23.700-60, 3rd Generation Partnership Project (3GPP), May 2022, (216 pages).

English-language Supplementary Search Report issued in European Application No. 23851304.8 dated Jul. 1, 2025, (10 pages).

* cited by examiner

DATA PACKET TRANSMISSION METHOD AND RELATED DEVICES

RELATED APPLICATION

This application is a continuation application of PCT Patent Application No. PCT/CN2023/095045, filed on May 18, 2023, which claims priority to Chinese Patent Application No. 2022109431479, entitled "DATA PACKET TRANSMISSION METHOD AND RELATED DEVICES" filed with the China National Intellectual Property Administration on Aug. 8, 2022, wherein the content of the above-referenced applications is incorporated herein by reference in its entirety.

FIELD OF THE TECHNOLOGY

The present disclosure relates to the field of communication technologies, and specifically, to a data packet transmission method, a communication device, a computer-readable storage medium, and a computer program product.

BACKGROUND OF THE DISCLOSURE

Under a transmission mechanism of a network such as a fifth generation (5G) mobile communication network in the related art, if different network scheduling policies are to be implemented for the same service, data packets of the same service flow need to be transmitted over different quality of service (QoS) flows in the network. However, the network has a limit on the upper limit of the number of QoS flows. If each service needs to be divided into multiple QoS flows to be transmitted, QoS flow resources of the network will be exhausted quickly, and it is difficult to meet the demands of more services.

SUMMARY

Embodiments of the present disclosure provide a data packet transmission method, a communication device, a computer-readable storage medium, and a computer program product, which can optimize a data packet transmission process.

Embodiments of the present disclosure provide a data packet transmission method. The method is performed by a network device. The method includes: obtaining quality of service profile information of a target service flow from a session management function network element, the quality of service profile information comprising a first data detection rule and a first processing rule, the first data detection rule comprising data packet set type internal identification information corresponding to at least one data packet set type of the target service flow, the first processing rule comprising a processing rule corresponding to the data packet set type, and the processing rule corresponding to the data packet set type comprising packet loss processing information corresponding to the data packet set type; receiving a data packet to be forwarded; determining whether to discard one or more data packets within the data packet set type according to the packet loss processing information in response to the data packet set type internal identification information of the data packet being matched with the first data detection rule; and determining data packets to be discarded within the data packet set type in response to determining to discard one or more data packets.

Embodiments of the present disclosure provide a data packet transmission method. The method is performed by an anchor user plane function network element. The method includes: obtaining a second data detection rule and a second processing rule of a target service flow from a session management function network element, the second data detection rule including data packet set type external identification information corresponding to at least one data packet set type of the target service flow, and the second processing rule including data packet set type internal identification information corresponding to the data packet set type external identification information; receiving a downlink data packet of the target service flow; marking the downlink data packet using the data packet set type internal identification information in the second processing rule in response to the data packet set type external identification information of the downlink data packet being matched with the second data detection rule; and transmitting the marked downlink data packet corresponding to the data packet set type internal identification information to a network device.

Embodiments of the present disclosure provide a data packet transmission method. The method is performed by a session management function network element. The method includes: obtaining a data packet processing policy rule from a policy control function network element, the data packet processing policy rule including a processing rule corresponding to at least one data packet set type of a target service flow, data packet set type external identification information and data packet set type internal identification information corresponding to the data packet set type external identification information, and the processing rule corresponding to the data packet set type including packet loss processing information corresponding to the data packet set type; generating quality of service profile information, a second data detection rule, a second processing rule, and a quality of service rule of the target service flow according to the data packet processing policy rule, the quality of service profile information including a first data detection rule and a first processing rule, the first data detection rule including the data packet set type internal identification information, the first processing rule including a processing rule corresponding to the data packet set type, the second data detection rule including the data packet set type external identification information, the second processing rule including the data packet set type internal identification information, and the quality of service rule including the data packet set type external identification information and the data packet set type internal identification information corresponding to the data packet set type external identification information; and transmitting the quality of service profile information to a network device, transmitting the second data detection rule and the second processing rule to an anchor user plane function network element, transmitting the first data detection rule and the first processing rule to a user plane function network element, and transmitting the quality of service rule to a terminal.

Embodiments of the present disclosure provide a data packet transmission method. The method is performed by a policy control function network element. The method includes: obtaining data packet set type external identification information corresponding to at least one data packet set type of a target service flow and network processing demand information thereof from an application function network element; determining data packet set type internal identification information corresponding to the data packet set type external identification information; generating a processing rule corresponding to the data packet set type according to the network processing demand information, the processing rule corresponding to the data packet set type including packet loss processing information corresponding to the data packet set type; and generating a data packet processing policy rule, the data packet processing policy rule including the processing rule corresponding to the data packet set type, the data packet set type external identification information and the data packet set type internal identification information corresponding to the data packet set type external identification information; and transmitting the data packet processing policy rule to a session management function network element.

Embodiments of the present disclosure provide a data packet transmission method. The method is performed by an application function network element. The method includes: transmitting data packet set type external identification information corresponding to at least one data packet set type of a target service flow and network processing demand information thereof to a policy control function network element through a request message, where the request message is used for instructing the policy control function network element to determine data packet set type internal identification information corresponding to the data packet set type external identification information according to the data packet set type external identification information, to generate a processing rule corresponding to the data packet set type according to the network processing demand information, and to generate a data packet processing policy rule, the data packet processing policy rule includes the processing rule corresponding to the data packet set type, the data packet set type external identification information and the data packet set type internal identification information corresponding to the data packet set type external identification information, and the processing rule corresponding to the data packet set type includes packet loss processing information corresponding to the data packet set type.

Embodiments of the present disclosure provide a data packet transmission method. The method is performed by a terminal. The method includes: obtaining a quality of service rule of a target service flow, the quality of service rule including data packet set type external identification information of at least one data packet set type of the target service flow and data packet set type internal identification information corresponding to the data packet set type external identification information; marking, in response to the data packet set type external identification information of an uplink data packet of the target service flow being matched with the quality of service rule, the uplink data packet using the corresponding data packet set type internal identification information; and transmitting the marked uplink data packet corresponding to the data packet set type internal identification information to a network device.

Embodiments of the present disclosure provide a network device, including: a receiving unit, configured to obtain quality of service profile information of a target service flow from a session management function network element, the quality of service profile information including a first data detection rule and a first processing rule, the first data detection rule including data packet set type internal identification information corresponding to at least one data packet set type of the target service flow, the first processing rule including a processing rule corresponding to the data packet set type, and the processing rule corresponding to the data packet set type including packet loss processing information corresponding to the data packet set type; the receiving unit, further configured to receive a data packet to be forwarded; and a processing unit, configured to determine whether to discard one or more data packets within the data packet set type according to the packet loss processing information in response to the data packet set type internal identification information of the data packet being matched with the first data detection rule, and determining data packets to be discarded within the data packet set type in response to determining to discard one or more data packets.

In some exemplary embodiments of the present disclosure, the data packet set type includes at least one of a video frame type, an audio frame type, a caption data type, or a control information type in the target service flow. Alternatively, the data packet set type includes at least one of a base video frame type or an enhancement layer data type within a video frame in the target service flow. Alternatively, the data packet set type includes at least one of an I frame type, a P frame type or a B frame type within a video frame in the target service flow.

In exemplary embodiments of the present disclosure, the processing rule corresponding to the data packet set type further includes quality of service information corresponding to the data packet set type. The processing unit is further configured to process the data packets within the data packet set type according to the quality of service information in response to the data packet set type internal identification information of the data packet being matched with the first data detection rule.

Embodiments of the present disclosure provide an anchor user plane function network element, including: a receiving unit, configured to obtain a second data detection rule and a second processing rule of a target service flow from a session management function network element, the second data detection rule including data packet set type external identification information corresponding to at least one data packet set type of the target service flow, and the second processing rule including data packet set type internal identification information corresponding to the data packet set type external identification information; the receiving unit, further configured to receive a downlink data packet of the target service flow; a processing unit, configured to mark the downlink data packet using the data packet set type internal identification information in the second processing rule in response to the data packet set type external identification information of the downlink data packet being matched with the second data detection rule; and a transmitting unit, configured to transmit the marked downlink data packet corresponding to the data packet set type internal identification information to a network device.

In some exemplary embodiments of the present disclosure, the processing unit is further configured to: mark a data set sequence number of the corresponding data packet set type in the downlink data packet using the second processing rule; and and/or, mark a data packet sequence number of the downlink data packet within a data set of the corresponding data packet set type in the downlink data packet using the second processing rule.

Embodiments of the present disclosure provide a session management function network element, including: a receiving unit, configured to obtain a data packet processing policy rule from a policy control function network element, the data packet processing policy rule including a processing rule corresponding to at least one data packet set type of a target service flow, data packet set type external identification information and data packet set type internal identification information corresponding to the data packet set type external identification information, and the processing rule corresponding to the data packet set type including packet loss processing information corresponding to the data packet set type; a processing unit, configured to generate quality of service profile information, a second data detection rule, a second processing rule, and a quality of service rule of the target service flow according to the data packet processing policy rule, the quality of service profile information including a first data detection rule and a first processing rule, the first data detection rule including the data packet set type internal identification information, the first processing rule including a processing rule corresponding to the data packet set type, the second data detection rule including the data packet set type external identification information, the second processing rule including the data packet set type internal identification information, and the quality of service rule including the data packet set type external identification information and the data packet set type internal identification information corresponding to the data packet set type external identification information; and a transmitting unit, configured to transmit the quality of service profile information to a network device, transmit the second data detection rule and the second processing rule to an anchor user plane function network element, transmit the first data detection rule and the first processing rule to a user plane function network element, and transmit the quality of service rule to a terminal.

Embodiments of the present disclosure provide a policy control function network element, including: a receiving unit, configured to obtain data packet set type external identification information corresponding to at least one data packet set type of a target service flow and network processing demand information thereof from an application function network element; a processing unit, configured to determine data packet set type internal identification information corresponding to the data packet set type external identification information; the processing unit, further configured to generate a processing rule corresponding to the data packet set type according to the network processing demand information, the processing rule corresponding to the data packet set type including packet loss processing information corresponding to the data packet set type; the processing unit, further configured to generate a data packet processing policy rule, the data packet processing policy rule including the processing rule corresponding to the data packet set type, the data packet set type external identification information and the data packet set type internal identification information corresponding to the data packet set type external identification information; and a transmitting unit, configured to transmit the data packet processing policy rule to a session management function network element.

Embodiments of the present disclosure provide an application function network element, including: a communication unit, configured to transmit data packet set type external identification information corresponding to at least one data packet set type of a target service flow and network processing demand information thereof to a policy control function network element through a request message, where the request message is used for instructing the policy control function network element to determine data packet set type internal identification information corresponding to the data packet set type external identification information according to the data packet set type external identification information, to generate a processing rule corresponding to the data packet set type according to the network processing demand information, and to generate a data packet processing policy rule, the data packet processing policy rule includes the processing rule corresponding to the data packet set type, the data packet set type external identification information and the data packet set type internal identification information corresponding to the data packet set type external identification information, and the processing rule corresponding to the data packet set type includes packet loss processing information corresponding to the data packet set type.

Embodiments of the present disclosure provide a terminal, including: a receiving unit, configured to obtain a quality of service rule of a target service flow, the quality of service rule including data packet set type external identification information of at least one data packet set type of the target service flow and data packet set type internal identification information corresponding to the data packet set type external identification information; a processing unit, configured to mark, in response to the data packet set type external identification information of an uplink data packet of the target service flow being matched with the quality of service rule, the uplink data packet using the corresponding data packet set type internal identification information; and a transmitting unit, configured to transmit the marked uplink data packet corresponding to the data packet set type internal identification information to a network device.

In some exemplary embodiments of the present disclosure, the processing unit is further configured to: mark a data set sequence number of the corresponding data packet set type in the uplink data packet using the quality of service rule; and/or, mark a data packet sequence number of the uplink data packet within a data set of the corresponding data packet set type in the uplink data packet using the quality of service rule.

Embodiments of the present disclosure provide a communication device, including: one or more processors; and a memory, configured to store one or more programs, the one or more programs, when executed by the one or more processors, causing the communication device to implement the data packet transmission method in embodiments of the present disclosure.

Embodiments of the present disclosure provide a computer-readable storage medium. The computer-readable storage medium stores a computer program. The computer program, when executed by a computer, causes the computer to implement the data packet transmission method in embodiments of the present disclosure.

Embodiments of the present disclosure provide a computer program product, including a computer program. The computer program, when executed by a computer, implements the data packet transmission method in embodiments of the present disclosure.

According to the method provided by some implementations of the present disclosure, a network device obtains quality of service profile information of a target service flow from a session management function network element, and the quality of service profile information includes a first data detection rule and a first processing rule. At the same time, the first data detection rule carries data packet set type internal identification information corresponding to at least one data packet set type of the target service flow. The first processing rule carries packet loss processing information corresponding to the data packet set type, whereby when the network device receives a data packet, it can be detected, according to the first data detection rule, whether the data packet set type internal identification information of the data packet is matched with the data packet set type internal identification information in the first data detection rule. In response to the data packet set type internal identification information of the data packet being matched with the data packet set type internal identification information in the first data detection rule, it may be further determined whether to discard data packets within the data packet set type according to the packet loss processing information corresponding to the data packet set type in the first processing rule. In response to the data packets within the data packet set type being to be discarded, it is determined which data packets within the data packet set type are discarded data packets according to the packet loss processing information, so as to realize optimization of a network transmission process of the data packet.

DESCRIPTION OF EMBODIMENTS

Figure 1:
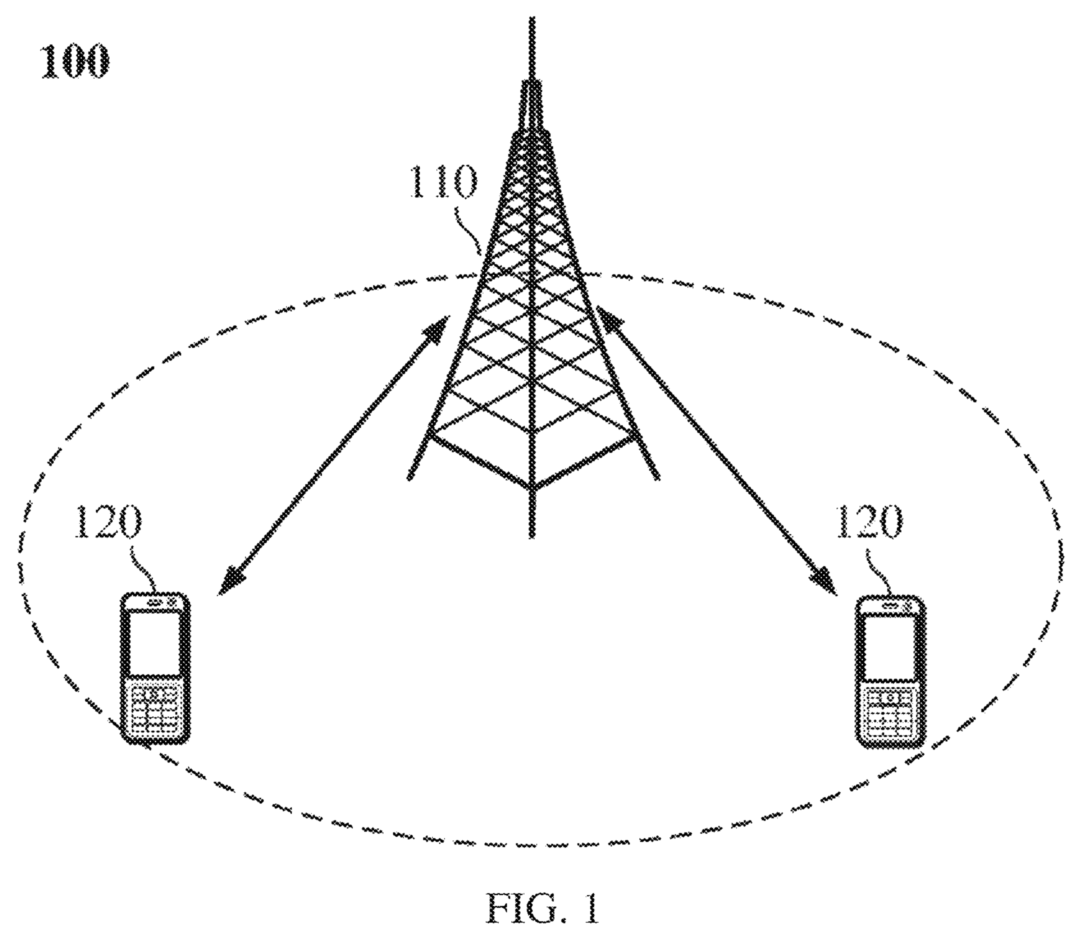
FIG. 1 is a schematic diagram of a communication system architecture according to embodiments of the present disclosure.

In order to make the objects, technical solutions and advantages of the present disclosure more apparent, example embodiments according to the present disclosure will be described in detail below with reference to the accompanying drawings. Throughout the accompanying drawings, the same reference numerals represent the same elements throughout. The embodiments described herein are illustrative only and will not be construed as limiting the scope of the present disclosure.

The technical solutions of embodiments of the present disclosure may be applied to various communication systems, such as: a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a 5G system, or a future evolved mobile communication system.

Exemplarily, a communication system 100 to which embodiments of the present disclosure are applied is shown in FIG. 1. The communication system 100 may include a network device 110. The network device 110 may be a device that communicates with a terminal 120 (or referred to as a communication terminal or a terminal). The network device 110 may provide communication coverage for a particular geographic region and may communicate with terminals located within the coverage region. In some embodiments, the network device 110 may be a base transceiver station (BTS) in a GSM system or a CDMA system, NodeB (NB) in a WCDMA system, an evolutional node B (eNB or eNodeB) in an LTE system, a base station in a 5G communication system, or a wireless controller in a cloud radio access network (CRAN). Alternatively, the network device may be a network-side device in a mobile switching center, a relay station, an access point, a vehicle-mounted device, a wearable device, a hub, a switch, a network bridge, a router, and a 5G network, or a network device in a future evolved public land mobile network (PLMN).

The communication system 100 further includes at least one terminal 120 located within the coverage of the network device 110. The "terminal" as used herein includes, but is not limited to, a connection via a wired line, such as via public switched telephone networks (PSTN), a digital subscriber line (DSL), a digital cable, or a direct cable connection; and/or another data connection/network; and/or via a wireless interface such as for a cellular network, a wireless local area network (WLAN), a digital television network such as a DVB-H network, a satellite network, and an AM-FM broadcast transmitter; and/or an apparatus of another terminal configured to receive/transmit a communication signal; and/or an Internet of things (IoT) device. The terminal configured to communicate through a wireless interface may be referred to as a "wireless communication terminal," a "wireless terminal," or a "mobile terminal". Examples of the mobile terminal include but are not limited to satellite or cellular phones; personal communications system (PCS) terminals that may combine cellular radio telephones with data processing, facsimile, and data communication capabilities; a PDA that may include a radio telephone, a pager, an Internet/Intranet access, a Web browser, a notebook, a calendar, and/or a global positioning system (GPS) receiver; and conventional laptop and/or handheld receivers or other electronic devices including radio telephone transceivers. The terminal may refer to an access terminal, a user equipment (UE), a subscriber unit, a subscriber station, a mobile radio station, a mobile station, a remote station, a remote terminal, a mobile device, a user terminal, a terminal, a wireless communication device, a user agent, or a user apparatus. The access terminal may be a cellular telephone, a cordless telephone, a session initiation protocol (SIP) telephone, a wireless local loop (WLL) station, a personal digital assistant (PDA), a handheld device having wireless communication functionality, a computing device or another processing device connected to a wireless modem, a vehicle-mounted device, a wearable device, a terminal in a 5G network or a terminal in a future evolved PLMN, or the like.

In some embodiments, a device to device (D2D) communication may be performed between the terminals 120.

FIG. 1 exemplarily shows one network device and two terminals. In some embodiments, the communication system 100 may include multiple network devices and other numbers of terminals may be included within the coverage of each network device, which is not limited by embodiments of the present disclosure.

In some embodiments, the communication system 100 may further include other network elements such as a policy control function network element or an access mobility management function network element, which are not limited by embodiments of the present disclosure.

A device having a communication function in a network/system in embodiments of the present disclosure may be referred to as a communication device. Taking the communication system 100 shown in FIG. 1 as an example, the communication device may include a network device 110 having a communication function and a terminal 120. The network device 110 and the terminal 120 may be specific devices described above. Details are not described herein again.

The terms "system" and "network" in this specification are often used interchangeably herein. The term "and/or" used in this specification describes only an association relationship for describing associated objects and represents that three relationships may exist. For example, A and/or B may represent the following three cases: only A exists, both A and B exist, and only B exists.

Figure 2:
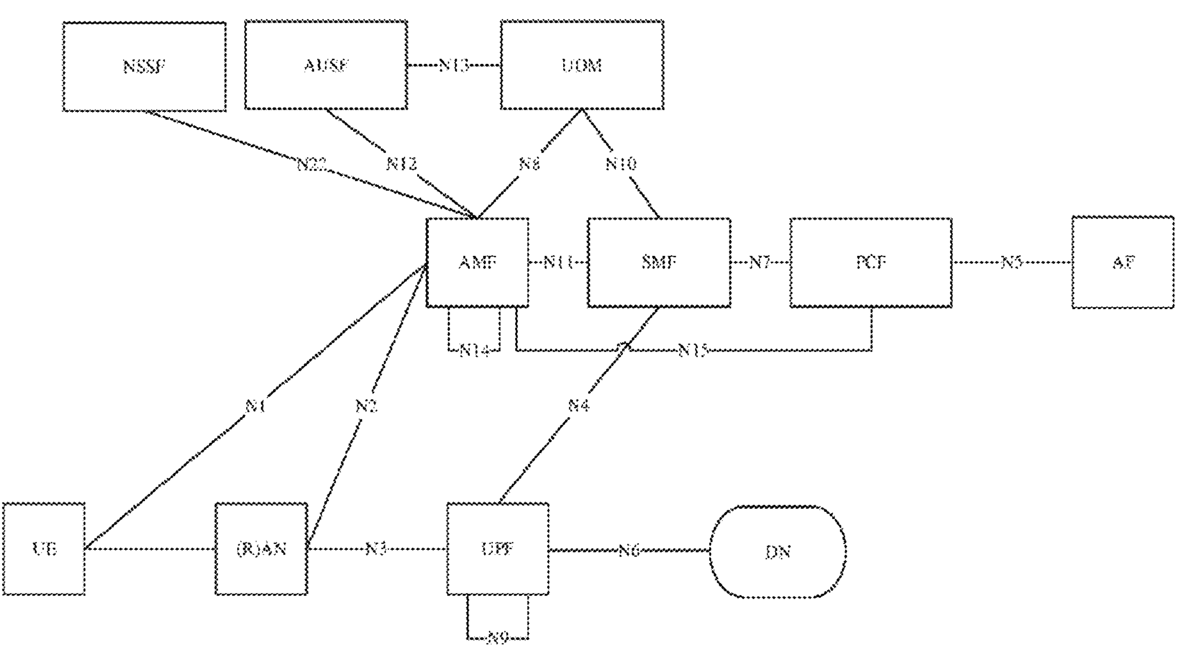
FIG. 2 is a system architecture diagram of a 5G network according to embodiments of the present disclosure.

FIG. 2 is a system architecture diagram of a 5G network according to embodiments of the present disclosure. As shown in FIG. 2, devices involved in the 5G network system include: a user equipment (UE), a radio access network (RAN), a user plane function (UPF) network element, a data network (DN), an access and mobility management function (AMF) network element, a session management function (SMF) network element, a policy control function (PCF) network element, an application function (AF) network element, an authentication server function (AUSF) network element, and a unified data management (UDM) network element.

Under a transmission mechanism of a network in the related art, if different network scheduling policies are to be implemented, services need to be divided into different QoS flows, and QoS scheduling may be carried out with the granularity of the QoS flows. For example, different scheduling priorities, transmission delays, packet loss rates, and other parameters may be set for different QoS flows.

In the related art, during implementation, data packets of the same service flow of the UE need to be transmitted over different QoS flows in the network according to different service types. However, the network has a limit on the upper limit of the number of QoS flows. If each service needs to be divided into multiple QoS flows to be transmitted, QoS flow resources of the network will be exhausted quickly, and it is difficult to meet the demands of more services. Moreover, when the amount of data of the same service flow needs to be calculated, if data packets of the service flow are transmitted over different QoS flows, it will also bring difficulties to the statistics of the service flow.

The method provided by embodiments of the present disclosure optimizes the network transmission of data packets (such as media data packets). When the data packets in the same target service flow contain multiple different data types, the data packets of different data types have different application scenarios and demands of network processing (such as adopting different packet loss policies and/or having different transmission delays, and the like).

Figure 3:
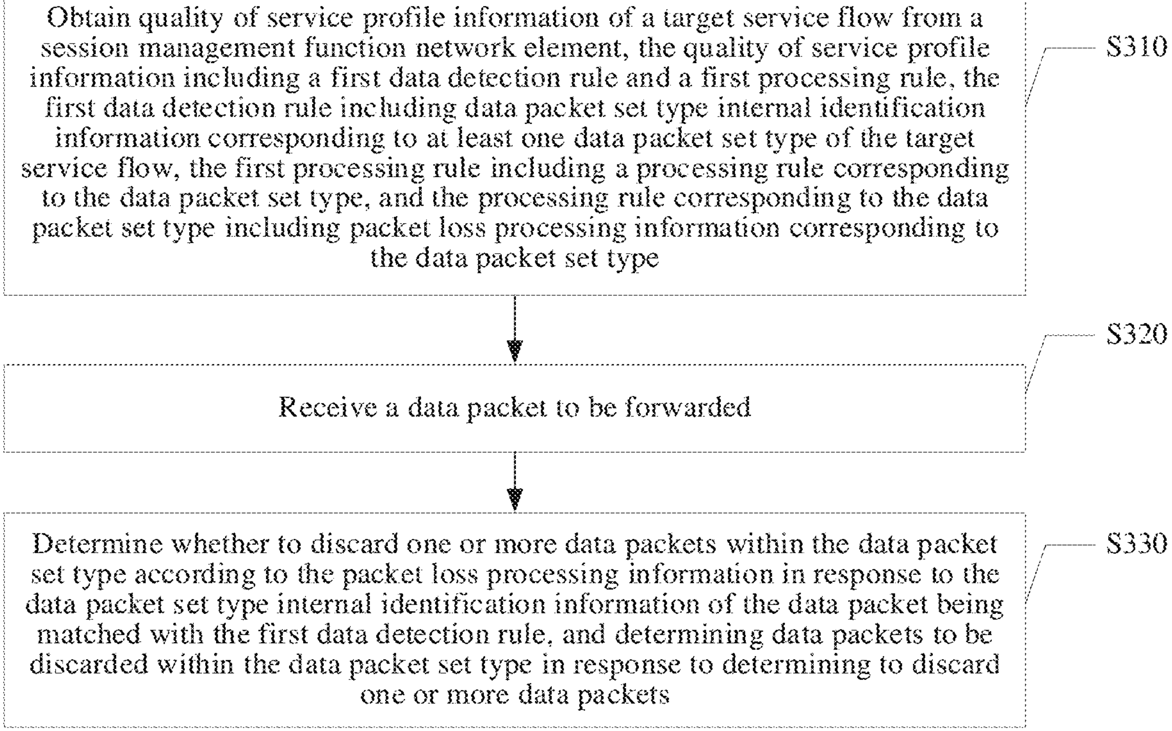
FIG. 3 schematically shows a flowchart of a data packet transmission method according to an embodiment of the present disclosure.

FIG. 3 schematically shows a flowchart of a data packet transmission method according to an embodiment of the present disclosure. The method provided by the embodiment of FIG. 3 may be performed by a network device (such as a base station), and the network device in embodiments of the present disclosure may be, for example, the network device 110 in FIG. 1, but the present disclosure is not limited thereto. Any communication device requiring detection and processing of data packets may employ the method provided by embodiments of the present disclosure.

As shown in FIG. 3, the method provided by embodiments of the present disclosure may include the following steps:

In S310, QoS profile information of a target service flow is obtained from a session management function network element.

In embodiments of the present disclosure, the base station may receive QoS profile information of a target service flow from an SMF network element. The QoS profile information may include a first data detection rule and a first processing rule.

In embodiments of the present disclosure, the first data detection rule may include data packet set type internal identification information corresponding to a data packet set type of the target service flow.

In embodiments of the present disclosure, the target service flow refers to a service flow formed by transmitting uplink data packets transmitted by a terminal and/or downlink data packets transmitted by a service server in a network for one or some target services. The target services may be set according to actual demands. For example, the target service may be a multimedia service, and corresponding data packets are referred to as media data packets or multimedia data packets, but the present disclosure is not limited thereto.

In embodiments of the present disclosure, data packets in the same target service flow may be divided into different data packet set types according to different network processing demands of the same target service flow. That is, there may be one data packet set type. The data packets divided into the same data packet set type are processed using the same manner (for example, the first data detection rule and the first processing rule).

In exemplary embodiments, the data packet set type may include at least one of a video frame type, an audio frame type, a caption data type, or a control information type in the target service flow. Alternatively, the data packet set type includes at least one of a base video frame type or an enhancement layer data type within a video frame in the target service flow. Alternatively, the data packet set type includes at least one of an I frame (intra-coding frame) type, a P frame (forward predictive coding frame) type, or a B frame (bidirectional predictive interpolation coding frame) type within a video frame in the target service flow.

For example, for the same target service flow, video frames/video data packets in the target service flow may be divided into the video frame type, audio frames/audio data packets into the audio frame type, caption data/caption data packets into the caption data type, and control information into the control information type.

As another example, the video frames in the same target service flow may be divided into the base video frame type or the enhancement layer data type.

As another example, the video frames in the same target service flow may be divided into the I frame type, the P frame type or the B frame type.

The data packet set types are for illustration only and the present disclosure is not limited thereto.

In embodiments of the present disclosure, the data packet set type internal identification information refers to identification information determined by a PCF network element in a network such as a core network and used for indicating a certain data packet set type corresponding to the data packets in the target service flow.

In exemplary embodiments, the first data detection rule may further include: a data set sequence number of the data packet set type; and/or, a data packet sequence number within a data set of the data packet set type. In some embodiments, the first data detection rule may further include first data packet number information in the data set of the data packet set type.

In embodiments of the present disclosure, the first processing rule may include a processing rule corresponding to the data packet set type. That is, the first processing rule is used for indicating a certain manner in which the data packets in the corresponding data packet set type are processed. Different processing rules are adopted for data packets in different data packet set types.

In embodiments of the present disclosure, the processing rule corresponding to the data packet set type may include packet loss processing information corresponding to the data packet set type. The packet loss processing information refers to information related to determining whether a packet is to be lost and how to lose a packet when packet loss processing (such as network congestion) is required. Different data packet set types may have different packet loss processing information.

In exemplary embodiments, the processing rule corresponding to the data packet set type may further include quality of service information corresponding to the data packet set type. The quality of service information refers to information related to indicating the QoS of data packets in the data packet set type, for example, one or more of parameters such as scheduling priority, transmission delay, and packet loss rate. In embodiments of the present disclosure, data packets in different data packet set types may have different quality of service information, and data packets in the same data packet set type may have the same quality of service information.

In S320, a data packet to be forwarded is received.

In embodiments of the present disclosure, the data packet may include an uplink data packet transmitted by the terminal and received by the network device, and/or may include a downlink data packet transmitted by the service server and received by the network device.

In S330, it is determined whether to discard data packets within the data packet set type according to the packet loss processing information in response to the data packet set type internal identification information of the data packet being matched with the first data detection rule, and discarded data packets within the data packet set type are determined when the data packets within the data packet set type are to be discarded.

In some embodiments, the first processing rule may be used for instructing the network device to determine whether to discard data packets within the data packet set type according to the packet loss processing information of the corresponding data packet set type in response to the data packet set type internal identification information of the data packet being matched with the first data detection rule, and to determine discarded data packets within the data packet set type when the data packets within the data packet set type are to be discarded.

In embodiments of the present disclosure, the base station may process the received data packet according to the first data detection rule and the first processing rule in the quality of service profile information. For example, when a network is congested, in response to the base station determining that a received data packet includes data packet set type internal identification information and the data packet set type internal identification information in the data packet is matched with data packet set type internal identification information in a first data detection rule, the base station may determine, according to packet loss processing information corresponding to a data packet set type in a first processing rule corresponding to the first data detection rule, whether to discard data packets within the data packet set type. In response to the data packets within the data packet set type being to be discarded, it is further determined which data packet(s) is/are to be discarded according to the packet loss processing information. The determined discarded data packets are referred to as discarded data packets, and the base station discards the discarded data packets and does not continuously transmit the discarded data packets in the network. The data packets within the data packet set type are continuously transmitted in response to the data packets within the data packet set type being not discarded. Alternatively, the remaining data packets within the data packet set type other than those determined to be discarded are continuously transmitted.

In embodiments of the present disclosure, in response to the base station detecting that the data packet does not include data packet set type internal identification information, or although data packet set type internal identification information exists in the data packet, the data packet set type internal identification information in the data packet is different from the data packet set type internal identification information in any one first data detection rule, it is determined that the data packet is not matched with the first data detection rule, and then the data packet is normally transmitted over the network.

In other embodiments, the operation of determining whether to discard data packets within the data packet set type according to the packet loss processing information in response to the data packet set type internal identification information of the data packet being matched with the first data detection rule and determining discarded data packets within the data packet set type when the data packets within the data packet set type are to be discarded may include: determining whether to discard data packets within a data set of the data packet set type according to the packet loss processing information in response to the data packet set type internal identification information of the data packet being matched with the first data detection rule; and determining discarded data packets in the corresponding data set according to the packet loss processing information when the data packets within the data set of the data packet set type are to be discarded.

In embodiments of the present disclosure, the first processing rule may be used for instructing the network device to determine whether to discard data packets within the data packet set type according to the packet loss processing information of the corresponding data packet set type in response to the data packet set type internal identification information of the data packet being matched with the first data detection rule, and to determine which data packet(s) within the corresponding data set of the data packet set type is/are to be discarded when the data packets within the data set of the data packet set type are to be discarded. The data packets within the data set of the data packet set type are continuously transmitted in response to the data packets within the data set of the data packet set type being not discarded. Alternatively, the remaining data packets within the data set of the data packet set type other than those determined to be discarded are continuously transmitted.

In embodiments of the present disclosure, the base station may detect the received data packet to determine whether the received data packet belongs to data packets of a target service flow (including uplink data packets and downlink data packets). When the received data packet belongs to the data packets of the target service flow, the first data detection rule is adopted to detect whether the data packet set type internal identification information of the data packet is matched with the data packet set type internal identification information in the first data detection rule.

The method provided by embodiments of the present disclosure may further include: processing the data packets within the data packet set type according to the quality of service information in response to the data packet set type internal identification information of the data packet being matched with the first data detection rule.

In exemplary embodiments, the operation of processing the data packets within the data set of the data packet set type according to the quality of service information in response to the data packet set type internal identification information of the data packet being matched with the first data detection rule may include: processing the data packets within the data set of the data packet set type according to the quality of service information in response to the data packet set type internal identification information of the data packet being matched with the first data detection rule.

The first data detection rule and the first processing rule may be combined into the same rule, may be divided into different rules, may be part of other rules, and may be part of a QoS profile. The rule may have different names depending on executing entities and the present disclosure is not limited thereto.

In exemplary embodiments, the first data detection rule may further include an uplink and downlink valid indication. The uplink and downlink valid indication may be used for indicating whether the first data detection rule is valid for uplink data packets, for downlink data packets, or for both uplink and downlink data packets.

In exemplary embodiments, the network device may determine that the first data detection rule is valid for an uplink service flow, a downlink service flow, or uplink and downlink service flows of the target service flow according to the uplink and downlink valid indication. In response to determining that the first data detection rule is valid for the downlink service flow, the data packet is processed according to the first data detection rule and the first processing rule in the quality of service profile information when the data packet belongs to the downlink service flow of the target service flow. In response to determining that the first data detection rule is valid for the uplink service flow, the data packet is processed according to the first data detection rule and the first processing rule in the quality of service profile information when the data packet belongs to the uplink service flow of the target service flow. In response to determining that the first data detection rule is valid for the uplink and downlink service flows, the uplink service flow and the downlink service flow of the target service flow are detected respectively, and the data packet is processed according to the first data detection rule and the first processing rule in the quality of service profile information.

Through the uplink and downlink valid indication, the network transmission of data packets of the target service flow may be detected and processed more accurately.

According to the data packet transmission method provided by implementations of the present disclosure, a network device obtains quality of service profile information of a target service flow from a session management function network element, and the quality of service profile information includes a first data detection rule and a first processing rule. At the same time, the first data detection rule carries data packet set type internal identification information corresponding to at least one data packet set type of the target service flow. The first processing rule carries packet loss processing information corresponding to the data packet set type, whereby when the network device receives a data packet, it can be detected, according to the first data detection rule, whether the data packet set type internal identification information of the data packet is matched with the data packet set type internal identification information in the first data detection rule. In response to the data packet set type internal identification information of the data packet being matched with the data packet set type internal identification information in the first data detection rule, it may be further determined whether to discard data packets within the data packet set type (or data packets within a data set of the data packet set type) according to the packet loss processing information corresponding to the data packet set type in the first processing rule. In response to the data packets within the data packet set type being to be discarded, it is determined which data packet(s) within the data set corresponding to a data set sequence number is/are discarded data packets according to the packet loss processing information, so as to realize optimization of a network transmission process of the data packet.

Figure 4:
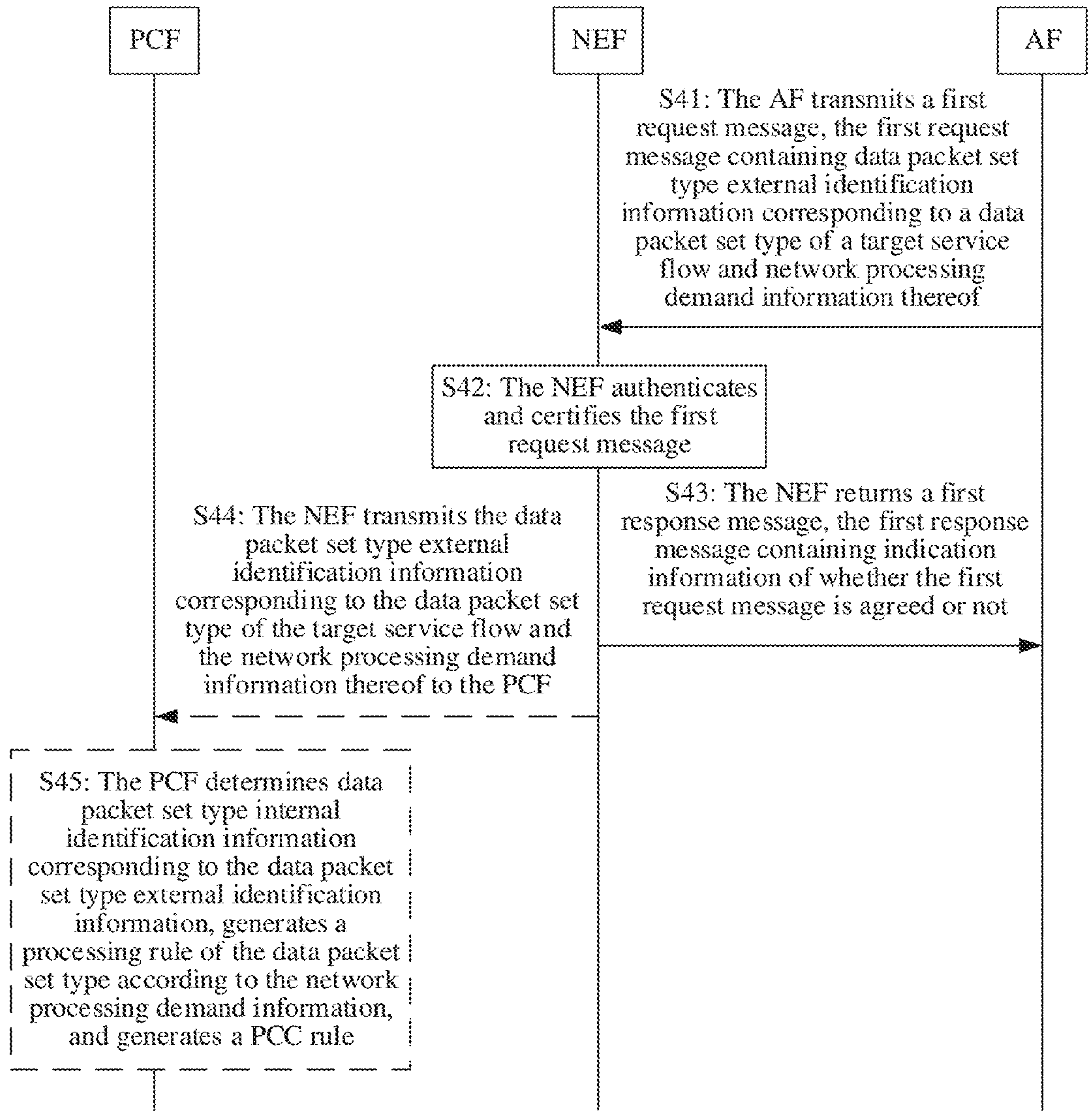
FIG. 4 schematically shows a schematic interaction diagram of a data packet transmission method according to an embodiment of the present disclosure.

FIG. 4 schematically shows a schematic interaction diagram of a data packet transmission method according to an embodiment of the present disclosure. As shown in FIG. 4, the method provided by embodiments of the present disclosure may include the following steps:

In S41, an AF network element transmits a first request message to a network exposure function (NEF) network element. The first request message may contain data packet set type external identification information corresponding to a data packet set type of a target service flow and network processing demand information thereof.

In embodiments of the present disclosure, the AF network element transmits a first request message to the NEF network element. The first request message may contain AF identification information (AF ID), data packet set type external identification information corresponding to each data packet set type and network processing demand information corresponding to the data packet set type external identification information. There may be one or more data packet set types, namely at least one data packet set type, and each data packet set type has corresponding network processing demand information. For example, data packet set type external identification information 1 of data packet set type 1 (namely, flow description information corresponding to data packet set type 1) and corresponding network processing demand information 1, data packet set type external identification information 2 of data packet set type 2 and corresponding network processing demand information 2, . . . , data packet set type external identification information n of data packet set type n and corresponding network processing demand information n are contained, where n is a positive integer greater than or equal to 1.

In embodiments of the present disclosure, the data packet set type external identification information of the target service flow refers to identification information determined by the AF network element and used for indicating a certain data packet set type corresponding to the data packets in the target service flow. The network processing demand information refers to related information of how the AF network element wants to process the data packets in the corresponding data packet set type or related information of how to process the data packets in the corresponding data packet set type, for example, one or more of related information of how to lose the data packets in the data packet set type and related information of adopting a certain QoS processing policy, or one or more of related information of how to lose the data packets in the data set of the data packet set type and related information of adopting a QoS processing policy in a certain data set.

In embodiments of the present disclosure, different data packet set types may be video frame types, audio frame types, caption data types, or control information types contained in the same target service flow, may be base video frame types or enhancement layer data types within a video frame, and may be I frame types, P frame types or B frame types within a video frame. The division of the data packet set type may be determined by the AF network element according to service characteristics. The data packet set type may also be understood as a data set type, namely a protocol data unit (PDU) Set Type.

In embodiments of the present disclosure, the AF network element may set different network processing demand information according to different data packet set types. For the same data packet set type, data packets in the data packet set type may be further divided into multiple data sets, and the multiple data sets share the same network processing demand information. That is, in the same data packet set type, a minimum unit for processing using the same network processing demand information is a data set with the data packet set type.

For example, in the data packet set type such as a video frame type, data packets in the video frame type may be further divided into multiple data sets, and may be indicated by the same network processing demand information. If only one data packet in a data set of the video frame type is lost, the remaining data packets in the data set may be discarded. Alternatively, it is indicated that if a loss rate or bit error rate or transmission delay of data packets in a data set of the video frame type reaches a certain threshold, the remaining data packets in the data set may be discarded.

As another example, in the data packet set type such as an audio frame type, data packets may be further divided into multiple data sets, and may be indicated by the same network processing demand information. The loss of the data packets in any one of the multiple data sets does not affect the continuous transmission of other data packets in any one of the multiple data sets.

In embodiments of the present disclosure, multiple manners may be adopted to determine how to divide data packets in the same data packet set type into multiple data sets. For different data packet set types, the dame or different division manners may be adopted.

For example, the data packets may be divided at equal intervals in time sequence. Assuming k data packets are included in the video frame type, m data packets may be divided into the same data set in sequence, where k is a positive integer greater than or equal to 1, and m is a positive integer greater than or equal to 1 and less than or equal to k.

As another example, the data packets may be divided at unequal intervals in time sequence.

As another example, data packets that have dependencies on each other may be divided into the same data set, and this interdependence may be set according to actual scenario demands, such as whether the data packets can be correctly decoded and/or correctly received depending on other data packets.

In embodiments of the present disclosure, determining whether different data packets have a relatively close dependency relationship may be configured according to actual scenarios. For example, if a data packet transmits coded image or video data, in response to whether the coded image or video data of the data packet is decoded with reference to other data packets after receiving the coded image or video data by a client (corresponding to a terminal) or a service server, different data packets with a reference or referenced relationship during decoding may be considered as having a relatively close dependency relationship, while different data packets without a reference or referenced relationship during decoding may be considered as not having a relatively close dependency relationship.

For different data packets having a relatively close dependency relationship, if the data packets dependent on other data packets are lost due to congestion and other reasons, the decoding of images or videos corresponding to other data packets dependent on the data packets may not be completed by the client or the server. By dividing the data packets having a dependency relationship into the same data set, embodiments of the present disclosure can ensure that other data packets dependent on the data packets may be correctly received and/or decoded, thereby reducing the decoding influence on the client or the server, and ensuring the service experience of target services such as multimedia services as much as possible. At the same time, when the network is congested, in response to dependent data packets within the data set being lost, all the data packets within the whole data set may be discarded directly, so that the network congestion situation can be alleviated, the occupied transmission resources can be reduced, and the network transmission of the data packets can be optimized.

In some embodiments, the first request message transmitted by the AF network element to the NEF network element may also contain at least one of target service flow template information of the target service flow and target DNN information and/or target S-NSSAI information of the target service flow, thereby reducing the number of interactions between the AF network element and the NEF network element.

In some embodiments, the first request message transmitted by the AF network element to the NEF network element may not contain target service flow template information and target DNN information and/or target S-NSSAI information of the target service flow. The AF network element may transmit the AF ID, the target service flow template information, and the target DNN information and/or the target S-NSSAI information of the target service flow to the NEF network element in advance through other messages. The NEF network element may store the AF ID in association with the target service flow template information and the target DNN information of the target service flow and/or the target S-NSSAI information. When the NEF network element receives the first request message, the target DNN information and/or the target S-NSSAI information of the target service flow may be found according to the AF ID carried in the first request message, so as to reduce the amount of data carried by the first request message.

In exemplary embodiments, the target service flow template information may include one or more of a source IP address (source network address), a source port number, a destination IP address (destination network address), a destination port number, a fully qualified domain name (FQDN), an application identity (APP ID), and the like of the target service flow.

In S42, after receiving the first request message transmitted by the AF network element, the NEF network element authenticates and certifies the first request message.

In S43, the NEF network element returns a first response message to the AF network element. The first response message may include indication information of whether the first request message is agreed or not.

In embodiments of the present disclosure, the NEF network element authenticates and certifies the first request message transmitted by the AF network element, and returns a first response message to the AF. The content of the first response message includes an indication information of "whether the first request message is agreed or not", and may further include a rejection reason value if rejected.

In S44, the NEF network element transmits the data packet set type external identification information corresponding to the data packet set type of the target service flow and the network processing demand information thereof to a PCF network element.

In embodiments of the present disclosure, after the NEF network element authenticates and certifies the first request message, the NEF network element may transmit the data packet set type external identification information corresponding to the data packet set type of the target service flow and the network processing demand information thereof, the target service flow template information, and the target DNN information and/or the target S-NSSAI information of the target service flow carried in the first request message to the PCF network element.

In S45, after the PCF network element receives the data packet set type external identification information corresponding to the data packet set type of the target service flow and the network processing demand information thereof transmitted by the NEF network element, data packet set type internal identification information corresponding to the data packet set type external identification information may be determined according to the packet set type external identification information, and a processing rule corresponding to the data packet set type may be generated according to the network processing demand information. The processing rule corresponding to the data packet set type may include packet loss processing information corresponding to the data packet set type. In some embodiments, the processing rule may further include quality of service information of the data packet set type. The PCF network element may also generate a policy and charging control (PCC) rule (data packet processing policy) according to the data packet set type external identification information, the data packet set type internal identification information corresponding to the data packet set type external identification information, and the processing rule corresponding to the data packet set type. The data packet set type external identification information, the data packet set type internal identification information corresponding to the data packet set type external identification information, and the processing rule corresponding to the data packet set type may be carried in the PCC rule, and then the PCC rule may be transmitted to the SMF network element.

In embodiments of the present disclosure, the data packet set type internal identification information determined by the PCF network element is different from or the same as the corresponding data packet set type external identification information. That is, the PCF network element may directly use the data packet set type external identification information as the data packet set type internal identification information, so as to instruct an anchor UPF network element to mark the data packet set type internal identification information on a downlink data packet and/or the terminal on a packet header of an uplink data packet. Therefore, when the base station or a UPF network element (the UPF network element includes an intermediate UPF network element and an anchor UPF network element) detects the received downlink data packet and/or uplink data packet, the data packet set type of the uplink data packet or the downlink data packet may be directly determined according to the data packet set type internal identification information carried in the packet header, thereby saving resources of the base station and the UPF network element.

In embodiments of the present disclosure, the PCF network element generates a corresponding PCC rule. In some embodiments, the PCC rule may include one or more of a sequence number of each data set within the data packet set type (referred to as a data set sequence number), sequence numbers of data packets in each data set (referred to as data packet sequence numbers within the data set), the number of data packets in each data set (referred to as first data packet number information), and the like in addition to data packet set type external identification information, data packet set type internal identification information corresponding to the data packet set type external identification information, and a processing rule.

The data set sequence number may be represented as a PDU set ID. That is, one or more data sets are included in a data packet set type. The data set sequence number is used for indicating a data set in the data packet set type to which each data set belongs, and used for uniquely identifying the data set in the data packet set type such as data set 1, data set 2 and data set 3 in the video frame type.

The data packet sequence number within a data set may be represented as a PDU sequence number within the PDU set. That is, a sequence number of a data packet in a data packet set type in a data set to which the data packet belongs is used for uniquely identifying the data packet in the data set of the data packet set type, such as data packet 1, data packet 2 and data packet 3 in data set 1, and data packet 1, data packet 2 and data packet 3 in data set 2.

The first data packet number information may be represented as Number of PDUs within a PDU Set, namely the number of data packets included in a data set of a data packet set type. For example, the number of data packets included within data set 1 is 5, and the number of data packets included in data set 2 is 6.

In embodiments of the present disclosure, if the PCC rule includes one or more of a data set sequence number, a data packet sequence number within a data set and first data packet number information, one or more of the data set sequence number, the data packet sequence number within the data set and the first data packet number information may be transmitted by the AF network element to the NEF network element and then forwarded by the NEF network element to the PCF network element, or determined by the NEF network element and then transmitted by the NEF network element to the PCF network element and the AF network element respectively. The present disclosure is not limited thereto.

In embodiments of the present disclosure, the SMF network element may generate a target service flow template according to the target service flow template information. The PCF network element may obtain the target service flow template information from the first request message transmitted by the AF network element, and may also obtain the target service flow template information in other manners. The present disclosure is not limited thereto.

In embodiments of the present disclosure, the target service flow template may include one or more of a source IP address, a source port number, a destination IP address, a destination port number, an FQDN, an APP ID, an Internet protocol (IP), and the like.

In some embodiments, the first data detection rule may also indicate whether the first data detection rule is valid for an uplink service flow, or for a downlink service flow, or both uplink and downlink service flows. That is, the first data detection rule may further include the uplink and downlink valid indication.

For example, if the target service flow template of the first data detection rule may contain an FQDN, it may be further indicated whether the first data detection rule is valid for the uplink service flow, the downlink service flow, or both the uplink and downlink service flows through the uplink and downlink valid indication.

In embodiments of the present disclosure, the SMF network element may define different data detection rules, and one or a combination of the data detection rules may be used as the first data detection rule.

In embodiments of the present disclosure, the SMF network element may reuse a packet detection rule (PDR) as the first data detection rule. That is, dependency identification information of data packets within a core network is added to the PDR, and PDRs to which the information is added and the manner of adding the information to the PDRs may be flexibly set. In other embodiments, the SMF network element may also add entirely new first data detection rules and first processing rules.

According to the data packet transmission method provided by implementations of the present disclosure, on the one hand, the AF network element may transmit a first request message to the NEF network element. By carrying data packet set type external identification information corresponding to a data packet set type of a target service flow, network processing demand information thereof and an AF ID in the first request message, the NEF network element does not need to specify the data packet set type external identification information of the target service flow, and the service server and/or the terminal may specify the data packet set type external identification information of a personalized target service flow. On the other hand, the NEF network element may also transmit the data packet set type external identification information corresponding to the data packet set type of the target service flow and the network processing demand information thereof to the PCF network element. The PCF network element may generate a PCC rule according to the data packet set type external identification information corresponding to the data packet set type of the target service flow and the network processing demand information thereof, and transmit the PCC rule to the SMF network element. Therefore, the SMF network element may generate quality of service profile information according to the PCC rule, and the quality of service profile information includes a first data detection rule and a first processing rule. The network transmission of a data packet, such as a media data packet, may be optimized using the first data detection rule and the first processing rule.

Figure 5:
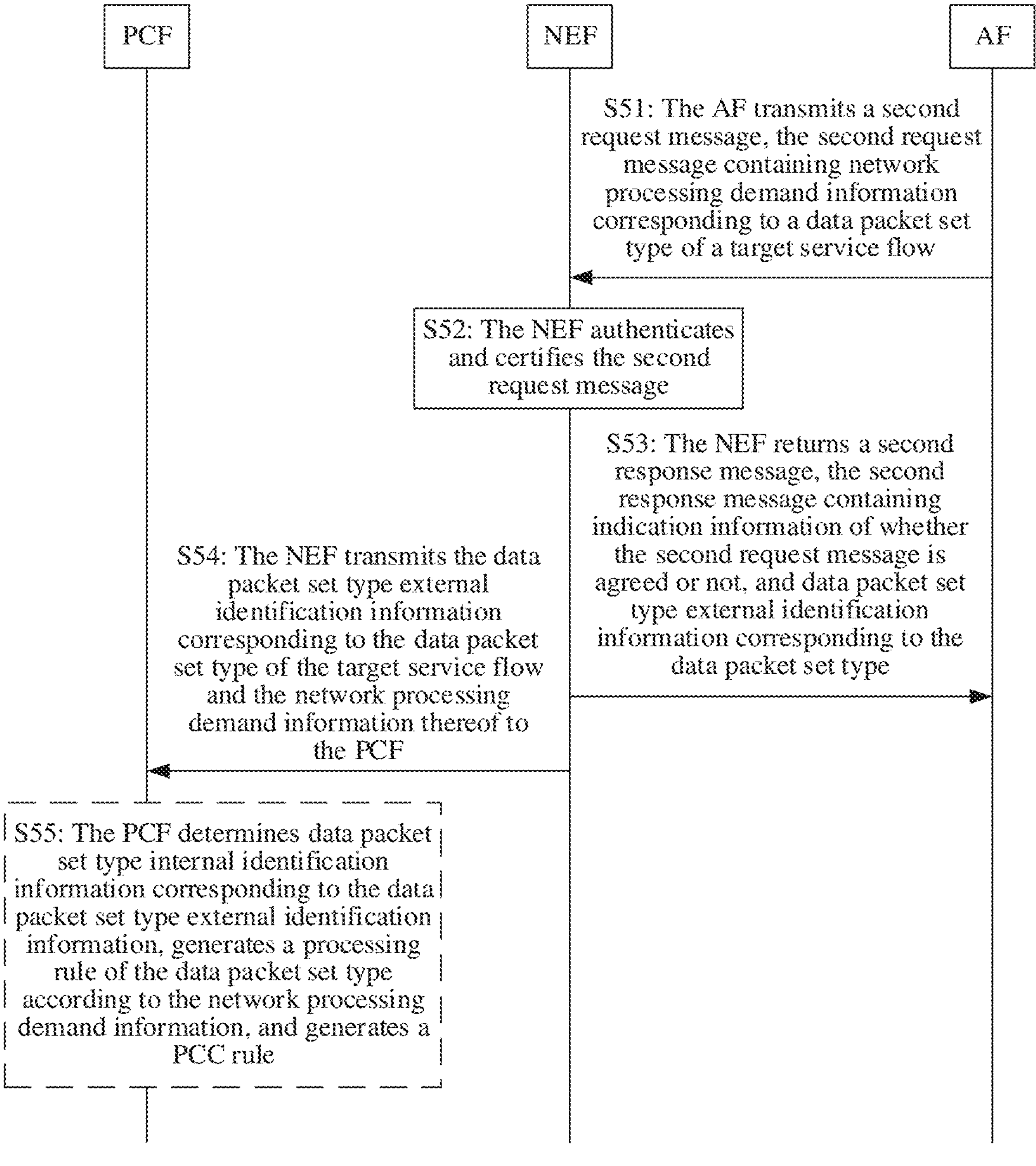
FIG. 5 schematically shows a schematic interaction diagram of a data packet transmission method according to another embodiment of the present disclosure.

FIG. 5 schematically shows a schematic interaction diagram of a data packet transmission method according to another embodiment of the present disclosure.

As shown in FIG. 5, the method provided by embodiments of the present disclosure may include the following steps:

In S51, an AF network element transmits a second request message to an NEF network element. The second request message may contain network processing demand information corresponding to a data packet set type of a target service flow and an AF ID, but does not carry data packet set type external identification information corresponding to the data packet set type of the target service flow.

In the embodiment of FIG. 5, the second request message transmitted by the AF network element to the NEF network element may not carry dependent external identification information of data packets of the target service flow. That is, the second request message may be used for instructing the NEF network element to determine the data packet set type external identification information corresponding to the data packet set type of the target service flow.

In some embodiments, the second request message may further include at least one of target service flow template information, target DNN information and/or target S-NSSAI information, thereby reducing the number of interactions between the AF network element and the NEF network element.

In some embodiments, the second request message transmitted by the AF network element to the NEF network element may not contain target service flow template information and target DNN information and/or target S-NSSAI information of the target service flow. The AF network element may transmit the AF ID, the target service flow template information, and the target DNN information and/or the target S-NSSAI information of the target service flow to the NEF network element in advance through other messages. The NEF network element may store the AF ID in association with the target service flow template information and the target DNN information of the target service flow and/or the target S-NSSAI information. When the NEF network element receives the second request message, the target DNN information and/or the target S-NSSAI information of the target service flow may be found according to the AF ID carried in the second request message, so as to reduce the amount of data carried by the second request message.

In S52, the NEF network element receives the second request message transmitted by the AF network element, and authenticates and certifies the second request message. After the authentication and certification are passed, the data packet set type external identification information corresponding to the data packet set type of the target service flow may be determined.

In S53, the NEF network element returns a second response message to the AF network element. The second response message may include indication information of whether the second request message is agreed or not. When the authentication and certification are passed, the second response message may further include the data packet set type external identification information corresponding to the data packet set type of the target service flow.

In S54, the NEF network element transmits the data packet set type external identification information corresponding to the data packet set type of the target service flow and the network processing demand information thereof to a PCF network element directly or indirectly.

In S55, after the PCF network element receives the data packet set type external identification information corresponding to the data packet set type of the target service flow and the network processing demand information thereof transmitted by the NEF network element, data packet set type internal identification information corresponding to the data packet set type external identification information may be determined according to the packet set type external identification information. A processing rule corresponding to the data packet set type may be generated according to the network processing demand information, and a PCC rule may be generated according to the data packet set type external identification information, the data packet set type internal identification information corresponding to the data packet set type external identification information, and the processing rule corresponding to the data packet set type. The data packet set type external identification information, the data packet set type internal identification information corresponding to the data packet set type external identification information, and the processing rule corresponding to the data packet set type are carried in the PCC rule, and then the PCC rule is transmitted to the SMF network element.

According to the data packet transmission method provided by implementations of the present disclosure, the second request message transmitted by the AF network element does not contain the data packet set type external identification information corresponding to the data packet set type of the target service flow, and the NEF network element specifies the data packet set type external identification information corresponding to the data packet set type of the target service flow, thereby avoiding the problem that the data packet set type external identification information corresponding to the data packet set type of the target service flow configured by different AF network elements conflicts.

Although the embodiments of FIG. 4 and FIG. 5 both take the interaction of information between an AF network element and a PCF network element through an NEF network element as an example, the present disclosure is not limited thereto. In other embodiments, the AF network element may also communicate directly with the PCF network element. The NEF network element may also store information requested by the AF in a UDR network element, and the PCF network element may receive the information from the UDR network element.

Figure 6:
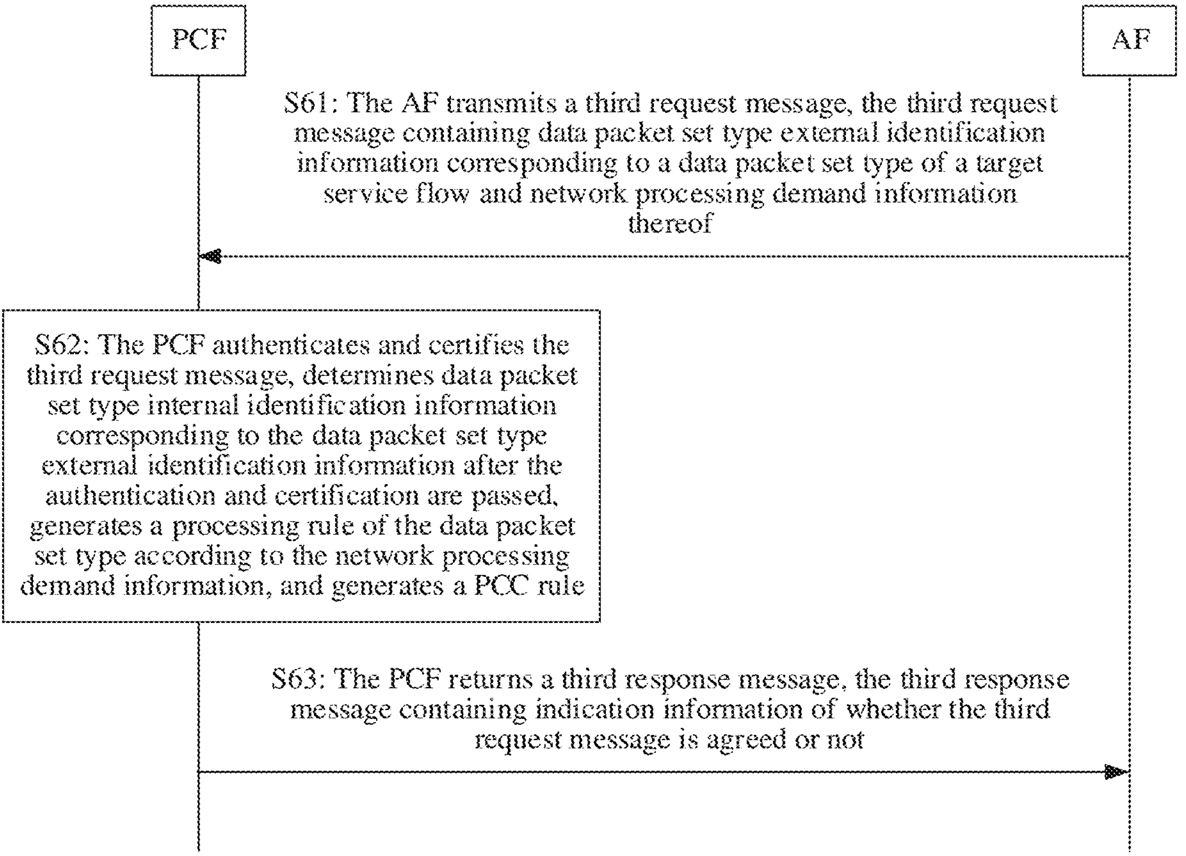
FIG. 6 schematically shows a schematic interaction diagram of a data packet transmission method according to still another embodiment of the present disclosure.

FIG. 6 schematically shows a schematic interaction diagram of a data packet transmission method according to still another embodiment of the present disclosure.

As shown in FIG. 6, the method provided by embodiments of the present disclosure may include the following steps:

In S61, an AF network element transmits a third request message to a PCF network element. The third request message may carry an AF ID, data packet set type external identification information corresponding to a data packet set type of a target service flow and network processing demand information thereof.

In some embodiments, the third request message may further include at least one of target service flow template information, target DNN information and/or target S-NSSAI information, thereby reducing the number of interactions between the AF network element and the PCF network element.

In some embodiments, the third request message may not include the target service flow template information, the target DNN information and/or the target S-NSSAI information, but may transmit the target service flow template information, the target DNN information and/or the target S-NSSAI information to the PCF network element in advance. The PCF network element stores the target service flow template information, the target DNN information and/or the target S-NSSAI information, and the AF ID in association, so as to be found after receiving the third request message, thereby reducing the amount of data carried by the third request message.

In S62, after the PCF network element receives the data packet set type external identification information corresponding to the data packet set type of the target service flow and the network processing demand information thereof transmitted by the AF network element, data packet set type internal identification information corresponding to the data packet set type external identification information may be determined according to the packet set type external identification information. A processing rule corresponding to the data packet set type may be generated according to the network processing demand information, and a PCC rule may be generated according to the data packet set type external identification information, the data packet set type internal identification information corresponding to the data packet set type external identification information, and the processing rule corresponding to the data packet set type. The data packet set type external identification information, the data packet set type internal identification information corresponding to the data packet set type external identification information, and the processing rule corresponding to the data packet set type are carried in the PCC rule, and then the PCC rule is transmitted to the SMF network element.

In S63, the PCF network element returns a third response message to the AF network element. The third response message may include indication information of whether the third request message is agreed or not.

In embodiments of the present disclosure, the AF network element may be a functional unit abstracted from the service server.

According to the method provided by embodiments of the present disclosure, for a certain UE, corresponding network processing rules may be flexibly set and executed according to different data packet types within the same target service flow (which may correspond to the same service server IP address), thereby optimizing network transmission performance and ensuring service experience. And in a congestion scenario, a differentiated packet loss mechanism for different data packet types is realized to ensure the service experience when the network quality is low.

Figure 7:
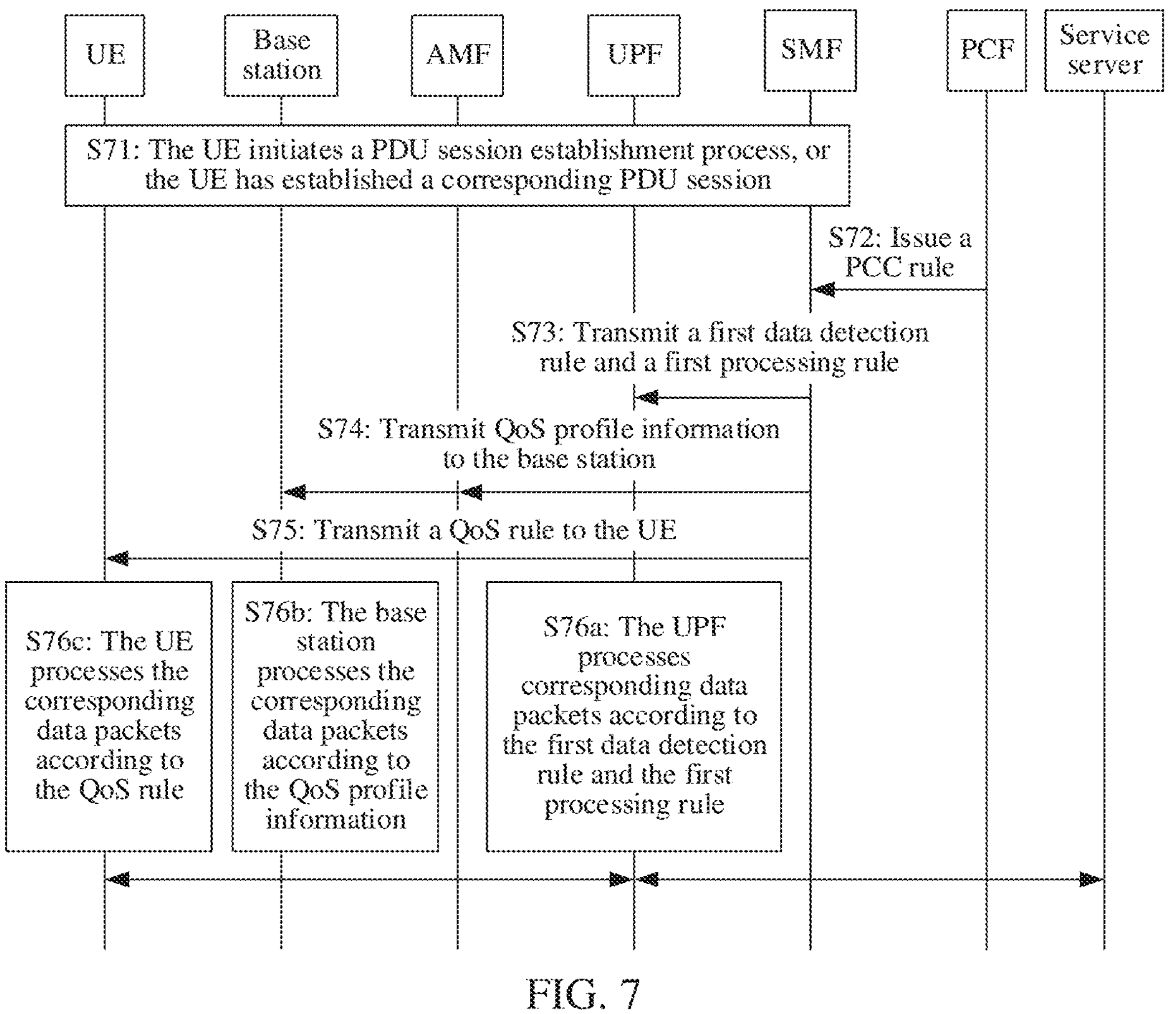
FIG. 7 schematically shows a schematic interaction diagram of a data packet transmission method according to yet another embodiment of the present disclosure.

FIG. 7 schematically shows a schematic interaction diagram of a data packet transmission method according to yet another embodiment of the present disclosure. In the embodiment of FIG. 7, a UE is used as a terminal and a base station is used as a network device. As shown in FIG. 7, the method provided by embodiments of the present disclosure may include the following steps:

In S71, the UE initiates a protocol data unit (PDU) session establishment process, or the UE has established a corresponding PDU session.

In embodiments of the present disclosure, the UE has established a PDU session of a target service (such as a specific target DNN or a target S-NSSAI), or the UE initiates a PDU session establishment process of the target service (such as a specific target DNN or a target S-NSSAI).

In S72, a PCF network element issues a PCC rule to an SMF network element.

In embodiments of the present disclosure, the PCC rule may carry data packet set type external identification information corresponding to a data packet set type of a target service flow, data packet set type internal identification information corresponding to the data packet set type external identification information, and a processing rule corresponding to the data packet set type. The processing rule corresponding to the data packet set type may include packet loss processing information corresponding to the data packet set type, and in some embodiments, may further include quality of service information corresponding to the data packet set type.

In S73, the SMF network element receives the PCC rule issued by the PCF network element, generates a first data detection rule and a first processing rule according to the data packet set type external identification information, the data packet set type internal identification information corresponding to the data packet set type external identification information, and the processing rule corresponding to the data packet set type carried in the PCC rule, and generates QoS profile information according to the first data detection rule and the first processing rule. The QoS profile information may include the first data detection rule and the first processing rule. The first data detection rule may include the data packet set type internal identification information. The first processing rule may include the processing rule corresponding to the data packet set type, and the first data detection rule and the first processing rule are transmitted to a UPF network element, where the UPF network element may be an anchor UPF network element or an intermediate UPF network element.

In embodiments of the present disclosure, the SMF network element may also generate a second data detection rule and a second processing rule according to the PCC rule. The second data detection rule may include the data packet set type external identification information. The second processing rule may include the data packet set type internal identification information corresponding to the data packet set type external identification information, and the second data detection rule and the second processing rule are transmitted to the anchor UPF network element. The second data detection rule is used for instructing the anchor UPF network element to detect whether data packet set type external identification information of a downlink data packet received by the anchor UPF network element from the service server is matched with the data packet set type external identification information of the target service flow in the second data detection rule.

The second processing rule is used for instructing the anchor UPF network element to mark a packet header of the downlink data packet using the corresponding data packet set type internal identification information in the second processing rule during the encapsulation of the downlink data packet, to encapsulate the downlink data packet, and to transmit the downlink data packet encapsulated and marked with the data packet set type internal identification information to the network device in response to the data packet set type external identification information of the downlink data packet being matched with the data packet set type external identification information of the target service flow contained in the second data detection rule. In response to the data packet set type external identification information of the downlink data packet being not matched with the data packet set type external identification information of the target service flow contained in the second data detection rule (no data packet set type external identification information exists in the downlink data packet, or although the data packet set type external identification information exists, the data packet set type external identification information is different from the data packet set type external identification information in the second data detection rule), the downlink data packet is not marked using the corresponding data packet set type internal identification information in the second processing rule during the encapsulation of the downlink data packet, and the downlink data packet encapsulated and not marked with the data packet set type internal identification information is transmitted to the network device.

In S74, the SMF network element may also generate or update QoS profile information according to the PCC rule and transmit the QoS profile information to an AMF network element. The QoS profile information may include a first data detection rule and a first processing rule.

In embodiments of the present disclosure, the SMF network element transmits generated QoS profile information or updated QoS profile information to the AMF network element. The QoS profile information may include a first data detection rule and a first processing rule.

The AMF network element receives the QoS profile information transmitted by the SMF network element and transmits the QoS profile information to the base station.

The base station receives the QoS profile information transmitted by the AMF network element.

In embodiments of the present disclosure, the base station is a point prone to congestion. Therefore, the QoS profile information may be configured at the base station to detect and process the uplink data packet transmitted by the UE and the downlink data packet transmitted by the service server respectively.

In S75, the SMF network element may also generate a QoS rule according to the PCC rule. The QoS rule may include data packet set type external identification information corresponding to a data packet set type of a target service flow and data packet set type internal identification information corresponding to the data packet set type external identification information. The QoS rule is transmitted to the UE.

In S76*a*, the UPF network element processes corresponding data packets according to the first data detection rule and the first processing rule.

In embodiments of the present disclosure, the UPF network element is a point prone to congestion. Therefore, the first data detection rule and the first processing rule may be configured at the UPF network element to detect and process the uplink data packet transmitted by the UE or the downlink data packet transmitted by the service server. The intermediate UPF network element and/or the anchor UPF network element may process the data packets of the target service flow according to the first data detection rule and the first processing rule. For the specific processing procedure, reference may be made to the process of the network device using the QoS profile information to process the data packet.

The anchor UPF network element may also receive the second data detection rule and the second processing rule to determine whether the data packet set type external identification information of the downlink data packet received from the service server is matched with the data packet set type external identification information of the target service flow in the second data detection rule.

In response to the anchor UPF network element detecting that the data packet set type external identification information of the downlink data packet received thereby is matched with the data packet set type external identification information of the target service flow contained in the second data detection rule, a packet header of the downlink data packet may be marked using the corresponding data packet set type internal identification information in the second processing rule during the encapsulation of the downlink data packet, the downlink data packet may be encapsulated, and the downlink data packet encapsulated and marked with the data packet set type internal identification information may be transmitted to the network device. In response to the anchor UPF network element detecting that the data packet set type external identification information of the downlink data packet received thereby is not matched with the data packet set type external identification information of the target service flow contained in the second data detection rule, the downlink data packet is not marked using the corresponding data packet set type internal identification information in the second processing rule during the encapsulation of the downlink data packet, the downlink data packet is encapsulated, and the downlink data packet encapsulated and not marked with the data packet set type internal identification information is transmitted to the network device.

For example, the anchor UPF network element may perform general packet radio service (GPRS) tunneling protocol (GTP) encapsulation on the downlink data packet, and mark the data packet set type internal identification information (PDU set Type) on the packet header of the downlink data packet, so as to be available for the base station to determine whether to discard the downlink data packet in the data packet set type and to determine which downlink data packets in the data packet set type are to be discarded.

In some embodiments, corresponding to the received downlink data packet, the anchor UPF network element may also mark one or more of a corresponding data set sequence number (PDU set ID), a data packet sequence number (PDU sequence number within the PDU set) and first data packet number information (Number of PDUs within a PDU set) in the packet header according to one or more of a data set sequence number of a data set to which the downlink data packet belongs, a data packet sequence number within the data set to which the downlink data packet belongs, and first data packet number information within the data set to which the downlink data packet belongs, during the GTP encapsulation of the downlink data packet when the data packet set type internal identification information of the downlink data packet received thereby is matched with the second data detection rule. When congestion occurs and data packets need to be discarded, it is possible to determine whether to discard data packets within data sets and to determine certain data packets within certain data sets according to the data set sequence number and the packet loss processing information corresponding to the data packet set type. Alternatively, the QoS of a data packet within a data set of the data packet set type is determined according to the data set sequence number and the quality of service information corresponding to the data packet set type.

In embodiments of the present disclosure, each data packet can only belong to at most one data set. That is, each data packet can only have at most one data packet set type and one data set sequence number. The data packet may not belong to any one data set.

In S76*b*, the base station processes the corresponding data packet according to the QoS profile information.

The base station processes the target service flow according to the first data detection rule and the first processing rule in the QoS profile information. When congestion occurs and data packets need to be discarded, it is possible to determine which data packets are to be discarded according to the data packet set type, the data set sequence number of the data packet set type, and the packet loss processing information of the data packet set type. In some embodiments, the corresponding QoS processing may be performed according to the data set sequence number and the QoS information of the data packet set type. The specific processing procedure may be described with reference to the above-mentioned embodiments.

In S76*c*, the UE processes the corresponding data packet according to the QoS rule.

After the UE receives the QoS rule, in response to detecting that the data packet set type external identification information of an uplink data packet to be transmitted thereby is matched with the data packet set type external identification information of the target service flow contained in the QoS rule, the uplink data packet may be marked at a packet header of the uplink data packet using the corresponding data packet set type internal identification information in the QoS rule, and the uplink data packet marked with the data packet set type internal identification information may be transmitted to the network device. In response to the UE detecting that the data packet set type external identification information of the uplink data packet is not matched with the data packet set type external identification information of the target service flow contained in the QoS rule, the uplink data packet is not marked using the corresponding data packet set type internal identification information in the QoS rule, but the uplink data packet is transmitted to the network device directly.

In some embodiments, for uplink data packets, in response to the UE detecting that data packet set type external identification information of an uplink data packet to be transmitted thereby is matched with the data packet set type external identification information of the target service flow contained in the QoS rule, one or more of a corresponding data set sequence number, a data packet sequence number within a data set to which the uplink data packet belongs and second data packet number information within the data set to which the uplink data packet belongs may be marked at the packet header during the encapsulation of the uplink data packet.

The sequence of execution of S73, S74, and S75 in the embodiment of FIG. 7 is not limited, and the steps may be executed in parallel. The sequence of execution of S76*a*, S76*b*, and S76*c* is not limited, and the steps may be executed in parallel.

According to the data packet transmission method provided by implementations of the present disclosure, the transmission of data packets with various types may be optimized, so that the same target service flow of the same UE may still be transmitted over the same QoS flow. In the same QoS flow, different data packet set types may be distinguished according to the types of data packets of the target service flow, and different service scheduling policies are set according to different data packet set types, such as adopting different packet loss policies or having different transmission delays, so as to realize finer-granularity and more flexible service scheduling capability, perform finer-granularity and flexible network transmission control for the target service flow, and optimize a network transmission mechanism.

Figure 8:
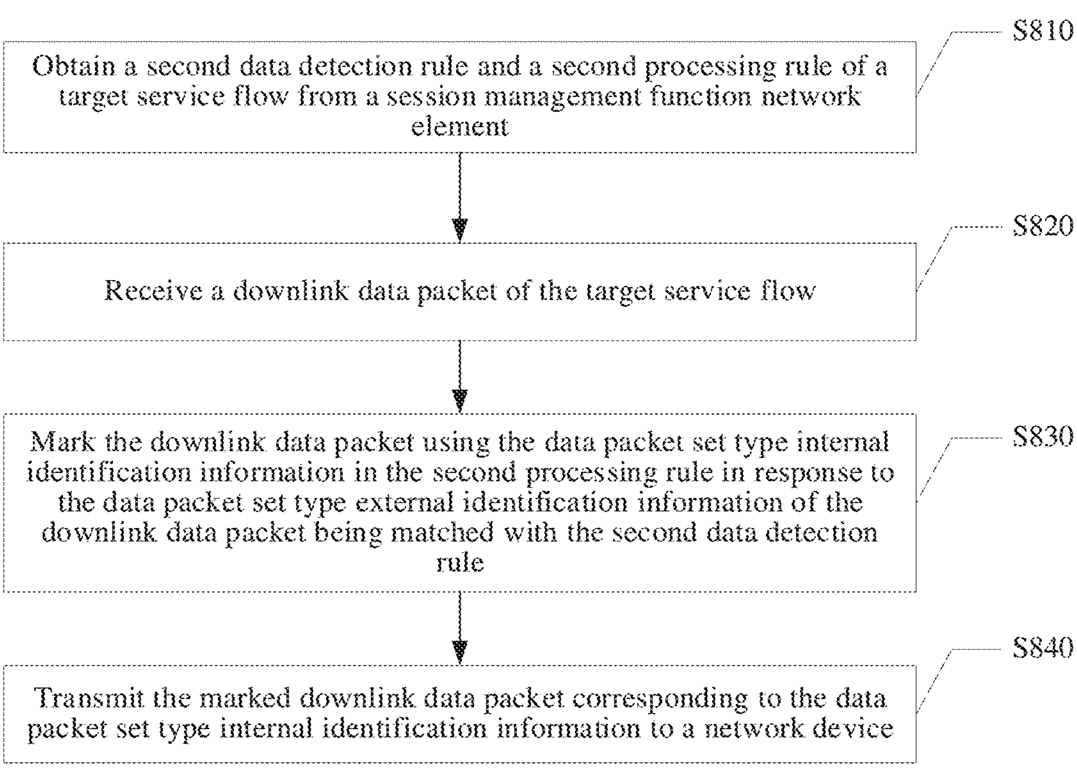
FIG. 8 schematically shows a flowchart of a data packet transmission method according to another embodiment of the present disclosure.

FIG. 8 schematically shows a flowchart of a data packet transmission method according to another embodiment of the present disclosure. The method provided by the embodiment of FIG. 8 may be performed by an anchor UPF network element.

As shown in FIG. 8, the method provided by embodiments of the present disclosure may include the following steps:

In S810, a second data detection rule and a second processing rule of a target service flow are obtained from a session management function network element. The second data detection rule may include data packet set type external identification information corresponding to at least one data packet set type of the target service flow. The second processing rule may include data packet set type internal identification information corresponding to the data packet set type external identification information.

In S820, a downlink data packet of the target service flow is received.

In S830, the downlink data packet is marked using the data packet set type internal identification information in the second processing rule in response to the data packet set type external identification information of the downlink data packet being matched with the second data detection rule.

In S840, the marked downlink data packet corresponding to the data packet set type internal identification information is transmitted to a network device.

In exemplary embodiments, the method may further include: marking a data set sequence number of the corresponding data packet set type in the downlink data packet using the second processing rule; and and/or, marking a data packet sequence number of the downlink data packet within a data set of the corresponding data packet set type in the downlink data packet using the second processing rule.

In some embodiments, the method may further include: marking, according to first data packet number information in the data set of the corresponding data packet set type, the first data packet number information in the downlink data packet using the second processing rule.

For other contents of the embodiment of FIG. 8, reference may be made to the above-mentioned other embodiments.

Figure 9:
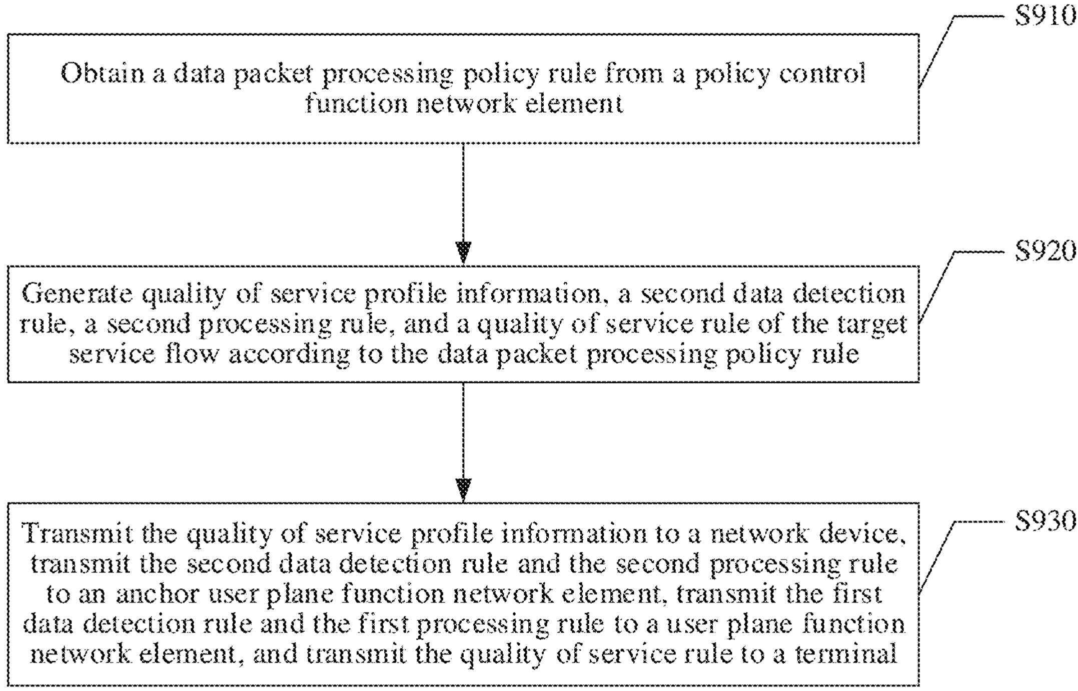
FIG. 9 schematically shows a flowchart of a data packet transmission method according to still another embodiment of the present disclosure.

FIG. 9 schematically shows a flowchart of a data packet transmission method according to still another embodiment of the present disclosure. The method provided by the embodiment of FIG. 9 may be performed by an SMF network element.

As shown in FIG. 9, the method provided by embodiments of the present disclosure may include the following steps:

In S910, a data packet processing policy rule is obtained from a policy control function network element. The data packet processing policy rule may include a processing rule corresponding to at least one data packet set type of a target service flow, data packet set type external identification information and data packet set type internal identification information corresponding to the data packet set type external identification information. The processing rule corresponding to the data packet set type may include packet loss processing information corresponding to the data packet set type.

In S920, quality of service profile information, a second data detection rule, a second processing rule, and a quality of service rule of the target service flow are generated according to the data packet processing policy rule. The quality of service profile information may include a first data detection rule and a first processing rule. The first data detection rule may include the data packet set type internal identification information. The first processing rule may include a processing rule corresponding to the data packet set type. The second data detection rule may include the data packet set type external identification information. The second processing rule may include the data packet set type internal identification information. The quality of service rule may include the data packet set type external identification information and the data packet set type internal identification information corresponding to the data packet set type external identification information.

In S930, the quality of service profile information is transmitted to a network device, the second data detection rule and the second processing rule are transmitted to an anchor user plane function network element, the first data detection rule and the first processing rule are transmitted to a user plane function network element, and the quality of service rule is transmitted to a terminal.

For other contents of the embodiment of FIG. 9, reference may be made to the above-mentioned other embodiments.

Figures 10, 11:
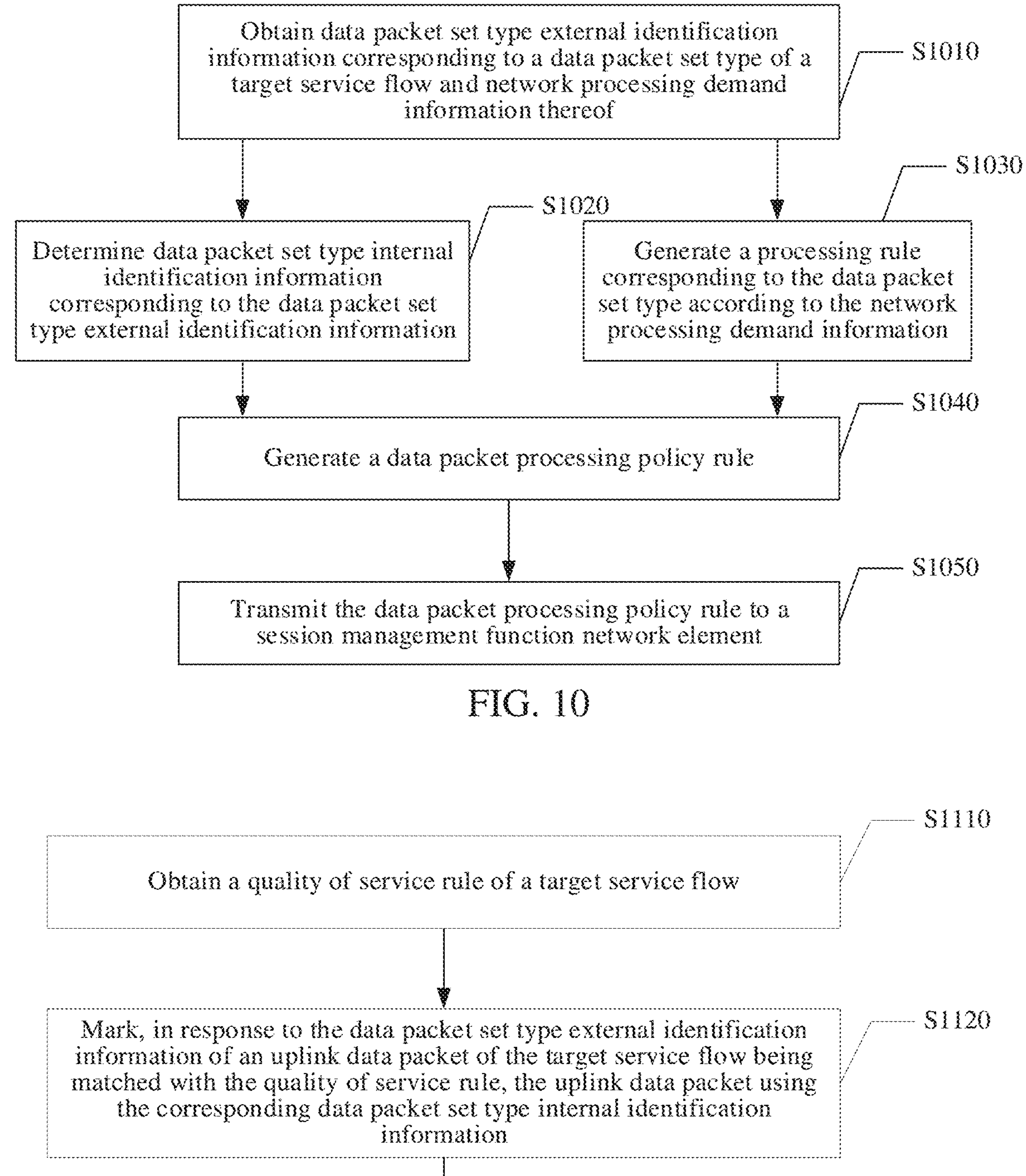
FIG. 10 schematically shows a flowchart of a data packet transmission method according to yet another embodiment of the present disclosure.
FIG. 11 schematically shows a flowchart of a data packet transmission method according to still another embodiment of the present disclosure.

FIG. 10 schematically shows a flowchart of a data packet transmission method according to yet another embodiment of the present disclosure. The method provided by the embodiment of FIG. 10 may be performed by a PCF network element.

As shown in FIG. 10, the method provided by embodiments of the present disclosure may include the following steps:

In S1010, data packet set type external identification information corresponding to at least one data packet set type of a target service flow and network processing demand information thereof are obtained from an application function network element.

In S1020, data packet set type internal identification information corresponding to the data packet set type external identification information is determined.

In S1030, a processing rule corresponding to the data packet set type is generated according to the network processing demand information. The processing rule corresponding to the data packet set type includes packet loss processing information corresponding to the data packet set type.

The sequence of execution of S1020 and S1030 in embodiments of the present disclosure is not limited. The steps may be executed in parallel, or S1020 may be executed before S1030, or S1030 may be executed before S1020.

In S1040, a data packet processing policy rule is generated. The data packet processing policy rule includes the processing rule corresponding to the data packet set type, the data packet set type external identification information and the data packet set type internal identification information corresponding to the data packet set type external identification information.

In S1050, the data packet processing policy rule is transmitted to a session management function network element.

For other contents of the embodiment of FIG. 10, reference may be made to the above-mentioned other embodiments.

Further, embodiments of the present disclosure further provide a data packet transmission method. The method may be performed by an AF network element. The method provided by embodiments of the present disclosure may include: transmitting data packet set type external identification information corresponding to at least one data packet set type of a target service flow and network processing demand information thereof to a policy control function network element through a request message.

The request message may be used for instructing the policy control function network element to determine data packet set type internal identification information corresponding to the data packet set type external identification information according to the data packet set type external identification information, to generate a processing rule corresponding to the data packet set type according to the network processing demand information, and to generate a data packet processing policy rule. The data packet processing policy rule may include the processing rule corresponding to the data packet set type, the data packet set type external identification information and the data packet set type internal identification information corresponding to the data packet set type external identification information. The processing rule corresponding to the data packet set type may include packet loss processing information corresponding to the data packet set type.

FIG. 11 schematically shows a flowchart of a data packet transmission method according to still another embodiment of the present disclosure. The method provided by the embodiment of FIG. 11 may be performed by a terminal.

As shown in FIG. 11, the method provided by embodiments of the present disclosure may include the following steps:

In S1110, a quality of service rule of a target service flow is obtained. The quality of service rule includes data packet set type external identification information of at least one data packet set type of the target service flow and data packet set type internal identification information corresponding to the data packet set type external identification information.

In S1120, in response to the data packet set type external identification information of an uplink data packet of the target service flow being matched with the quality of service rule, the uplink data packet is marked using the corresponding data packet set type internal identification information.

In exemplary embodiments, the method may further include: marking a data set sequence number of the corresponding data packet set type in the uplink data packet using the quality of service rule; and/or, marking a data packet sequence number of the uplink data packet within a data set of the corresponding data packet set type in the uplink data packet using the quality of service rule. In some embodiments, the method may further include: marking, according to second data packet number information in the data set of the corresponding data packet set type, the second data packet number information in the uplink data packet using the quality of service rule.

In S1130, the marked uplink data packet corresponding to the data packet set type internal identification information is transmitted to a network device.

For other contents of the embodiment of FIG. 11, reference may be made to the above-mentioned other embodiments.

Further, embodiments of the present disclosure also provide a data packet transmission method. The method may be performed by a user plane function network element (which may be an anchor UPF or an intermediate UPF). The method may include: obtaining a first data detection rule and a first processing rule of a target service flow from a session management function network element, where the first data detection rule may include data packet set type internal identification information corresponding to at least one data packet set type of the target service flow, the first processing rule may include a processing rule corresponding to the data packet set type, and the processing rule corresponding to the data packet set type may include packet loss processing information corresponding to the data packet set type; and receiving a data packet; and determining whether to discard data packets within the data packet set type according to the packet loss processing information in response to the data packet set type internal identification information of the data packet being matched with the first data detection rule, and determining discarded data packets within the data packet set type when the data packets within the data packet set type are to be discarded.

Figure 12:
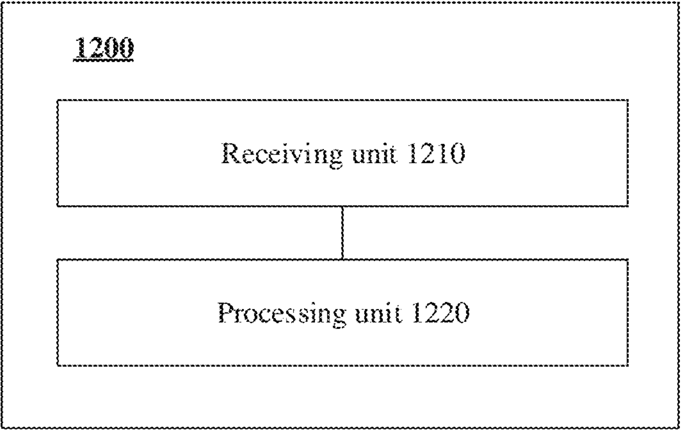
FIG. 12 schematically shows a schematic structural diagram of a network device according to an embodiment of present disclosure.

A network device 1200 provided by an embodiment of FIG. 12 may include a receiving unit 1210 and a processing unit 1220.

The receiving unit 1210 may be configured to obtain quality of service profile information of a target service flow from a session management function network element. The quality of service profile information may include a first data detection rule and a first processing rule. The first data detection rule may include data packet set type internal identification information corresponding to at least one data packet set type of the target service flow. The first processing rule may include a processing rule corresponding to the data packet set type. The processing rule corresponding to the data packet set type may include packet loss processing information corresponding to the data packet set type.

The receiving unit 1210 may be further configured to receive a data packet to be forwarded.

The processing unit 1220 may be configured to determine whether to discard data packets within the data packet set type according to the packet loss processing information in response to the data packet set type internal identification information of the data packet being matched with the first data detection rule, and determine discarded data packets within the data packet set type when the data packets within the data packet set type are to be discarded.

In exemplary embodiments, the first data detection rule may further include: a data set sequence number of the data packet set type; and/or, a data packet sequence number within a data set of the data packet set type. In some embodiments, the first data detection rule may further include first data packet number information in the data set of the data packet set type.

In exemplary embodiments, the first data detection rule may further include a data set sequence number of the data packet set type. The processing unit 1220 may be further configured to: determine whether to discard data packets within a data set of the data packet set type according to the packet loss processing information in response to the data packet set type internal identification information of the data packet being matched with the first data detection rule; and determine discarded data packets in the corresponding data set according to the packet loss processing information when the data packets within the corresponding data set of the data packet set type are to be discarded.

In exemplary embodiments, the data packet set type may include at least one of a video frame type, an audio frame type, a caption data type, or a control information type in the target service flow. Alternatively, the data packet set type may include at least one of a base video frame type or an enhancement layer data type within a video frame in the target service flow. Alternatively, the data packet set type may include at least one of an I frame type, a P frame type or a B frame type within a video frame in the target service flow.

In exemplary embodiments, the processing rule corresponding to the data packet set type may further include quality of service information corresponding to the data packet set type. The processing unit 1220 may be further configured to process the data packets within the data packet set type according to the quality of service information in response to the data packet set type internal identification information of the data packet being matched with the first data detection rule.

In exemplary embodiments, the processing unit 1220 may be further configured to: process the data packets within the data set of the data packet set type according to the quality of service information in response to the data packet set type internal identification information of the data packet being matched with the first data detection rule.

For other contents of the embodiment of FIG. 12, reference may be made to the above-mentioned other embodiments.

Figure 13:
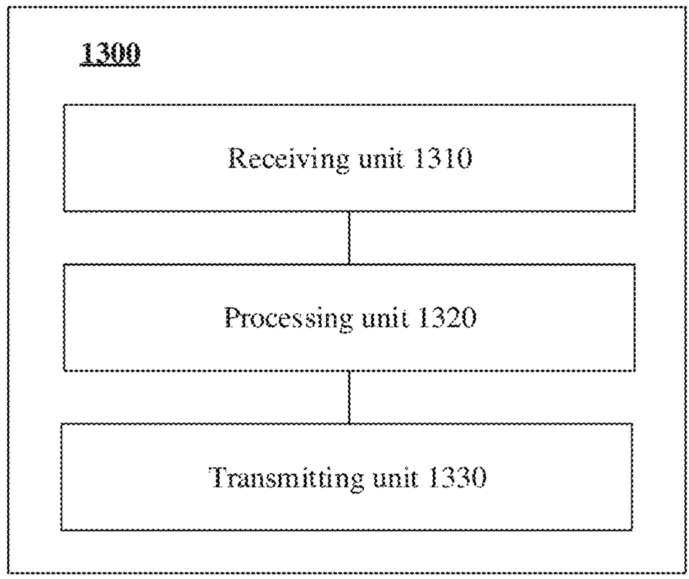
FIG. 13 schematically shows a schematic structural diagram of an anchor user plane function network element according to an embodiment of present disclosure.

An anchor user plane function network element 1300 provided by an embodiment of FIG. 13 may include a receiving unit 1310, a processing unit 1320, and a transmitting unit 1330.

The receiving unit 1310 may be configured to obtain a second data detection rule and a second processing rule of a target service flow from a session management function network element. The second data detection rule may include data packet set type external identification information corresponding to at least one data packet set type of the target service flow. The second processing rule may include data packet set type internal identification information corresponding to the data packet set type external identification information.

The receiving unit 1310 may be further configured to receive a downlink data packet of the target service flow.

The processing unit 1320 may be configured to mark the downlink data packet using the data packet set type internal identification information in the second processing rule in response to the data packet set type external identification information of the downlink data packet being matched with the second data detection rule.

In exemplary embodiments, the processing unit 1320 may be further configured to: mark a data set sequence number of the corresponding data packet set type in the downlink data packet using the second processing rule; and and/or, mark a data packet sequence number of the downlink data packet within a data set of the corresponding data packet set type in the downlink data packet using the second processing rule. In some embodiments, the processing unit 1320 may be further configured to: mark, according to first data packet number information in the data set of the corresponding data packet set type, the first data packet number information in the downlink data packet using the second processing rule.

The transmitting unit 1330 may be configured to transmit the marked downlink data packet corresponding to the data packet set type internal identification information to a network device.

For other contents of the embodiment of FIG. 13, reference may be made to the above-mentioned other embodiments.

Figure 14:
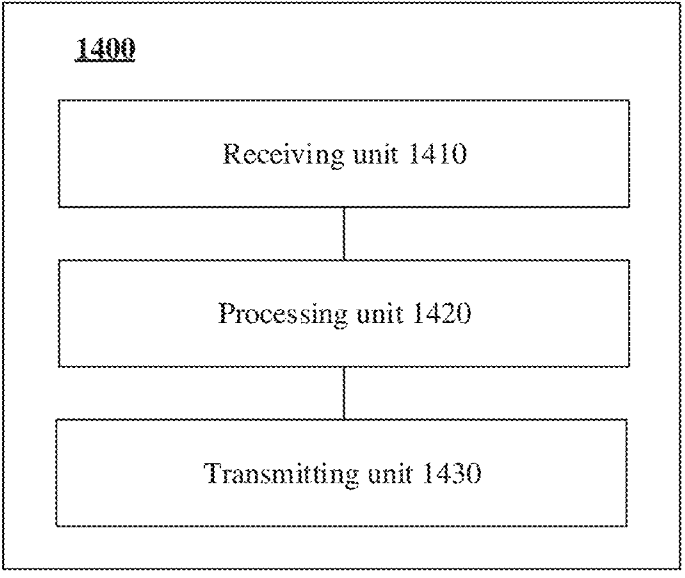
FIG. 14 schematically shows a schematic structural diagram of a session management function network element according to an embodiment of present disclosure.

A session management function network element 1400 provided by an embodiment of FIG. 14 may include a receiving unit 1410, a processing unit 1420, and a transmitting unit 1430.

The receiving unit 1410 may be configured to obtain a data packet processing policy rule from a policy control function network element. The data packet processing policy rule may include a processing rule corresponding to at least one data packet set type of a target service flow, data packet set type external identification information and data packet set type internal identification information corresponding to the data packet set type external identification information. The processing rule corresponding to the data packet set type may include packet loss processing information corresponding to the data packet set type.

The processing unit 1420 may be configured to generate quality of service profile information, a second data detection rule, a second processing rule, and a quality of service rule of the target service flow according to the data packet processing policy rule. The quality of service profile information may include a first data detection rule and a first processing rule. The first data detection rule may include the data packet set type internal identification information. The first processing rule may include a processing rule corresponding to the data packet set type. The second data detection rule may include the data packet set type external identification information. The second processing rule may include the data packet set type internal identification information. The quality of service rule may include the data packet set type external identification information and the data packet set type internal identification information corresponding to the data packet set type external identification information.

The transmitting unit 1430 may be configured to transmit the quality of service profile information to a network device, transmit the second data detection rule and the second processing rule to an anchor user plane function network element, transmit the first data detection rule and the first processing rule to a user plane function network element, and transmit the quality of service rule to a terminal.

For other contents of the embodiment of FIG. 14, reference may be made to the above-mentioned other embodiments.

Figure 15:
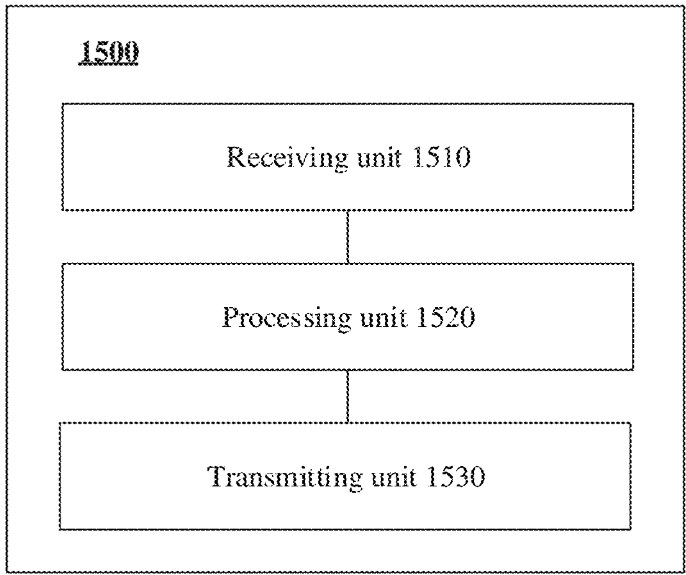
FIG. 15 schematically shows a schematic structural diagram of a policy control function network element according to an embodiment of present disclosure.

A policy control function network element 1500 provided by an embodiment of FIG. 15 may include a receiving unit 1510, a processing unit 1520, and a transmitting unit 1530.

The receiving unit 1510 may be configured to obtain data packet set type external identification information corresponding to at least one data packet set type of a target service flow and network processing demand information thereof from an application function network element.

The processing unit 1520 may be configured to determine data packet set type internal identification information corresponding to the data packet set type external identification information.

The processing unit 1520 may be further configured to generate a processing rule corresponding to the data packet set type according to the network processing demand information. The processing rule corresponding to the data packet set type may include packet loss processing information corresponding to the data packet set type.

The processing unit 1520 may be further configured to generate a data packet processing policy rule. The data packet processing policy rule may include the processing rule corresponding to the data packet set type, the data packet set type external identification information and the data packet set type internal identification information corresponding to the data packet set type external identification information.

The transmitting unit 1530 may be configured to transmit the data packet processing policy rule to a session management function network element.

For other contents of the embodiment of FIG. 15, reference may be made to the above-mentioned other embodiments.

Figure 16:
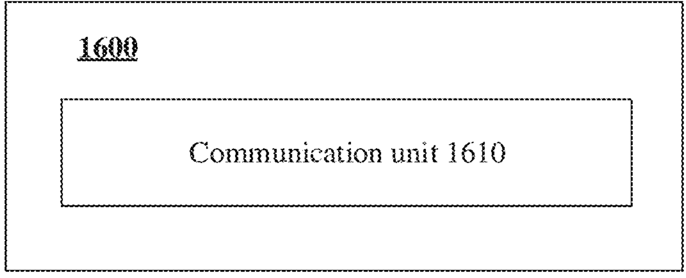
FIG. 16 schematically shows a schematic structural diagram of an application function network element according to an embodiment of present disclosure.

An application function network element 1600 provided by an embodiment of FIG. 16 may include a communication unit 1610.

The communication unit 1610 may be configured to transmit data packet set type external identification information corresponding to at least one data packet set type of a target service flow and network processing demand information thereof to a policy control function network element through a request message.

The request message may be used for instructing the policy control function network element to determine data packet set type internal identification information corresponding to the data packet set type external identification information according to the data packet set type external identification information, to generate a processing rule corresponding to the data packet set type according to the network processing demand information, and to generate a data packet processing policy rule. The data packet processing policy rule may include the processing rule corresponding to the data packet set type, the data packet set type external identification information and the data packet set type internal identification information corresponding to the data packet set type external identification information. The processing rule corresponding to the data packet set type may include packet loss processing information corresponding to the data packet set type.

For other contents of the embodiment of FIG. 16, reference may be made to the above-mentioned other embodiments.

Figure 17:
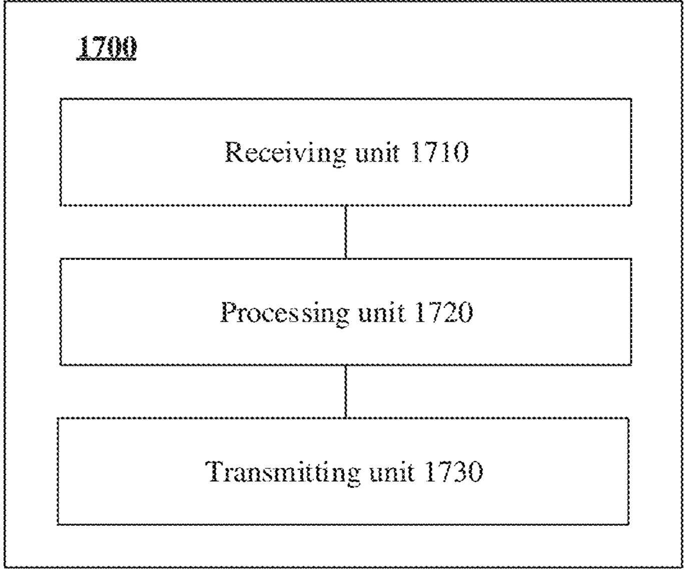
FIG. 17 schematically shows a schematic structural diagram of a terminal according to an embodiment of present disclosure.

A terminal 1700 provided by an embodiment of FIG. 17 may include a receiving unit 1710, a processing unit 1720, and a transmitting unit 1730.

The receiving unit 1710 may be configured to obtain a quality of service rule of a target service flow. The quality of service rule may include data packet set type external identification information of at least one data packet set type of the target service flow and data packet set type internal identification information corresponding to the data packet set type external identification information.

The processing unit 1720 may be configured to mark, in response to the data packet set type external identification information of an uplink data packet of the target service flow being matched with the quality of service rule, the uplink data packet using the corresponding data packet set type internal identification information.

In exemplary embodiments, the processing unit 1720 may be further configured to: mark a data set sequence number of the corresponding data packet set type in the uplink data packet using the quality of service rule; and/or, mark a data packet sequence number of the uplink data packet within a data set of the corresponding data packet set type in the uplink data packet using the quality of service rule. In some embodiments, the processing unit 1720 may be further configured to: mark, according to second data packet number information in the data set of the corresponding data packet set type, the second data packet number information in the uplink data packet using the quality of service rule.

The transmitting unit 1730 may be configured to transmit the marked uplink data packet corresponding to the data packet set type internal identification information to a network device.

For other contents of the embodiment of FIG. 17, reference may be made to the above-mentioned other embodiments.

Figure 18:
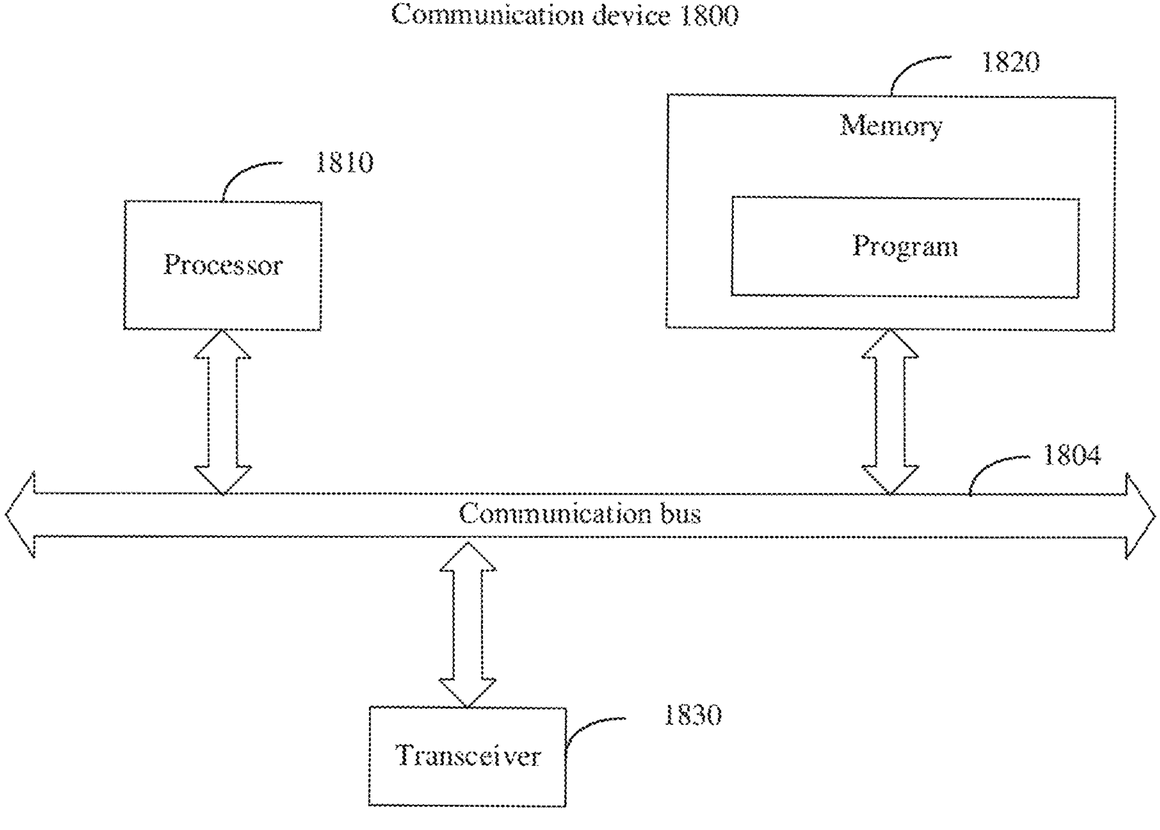
FIG. 18 schematically shows a schematic structural diagram of a communication device according to an embodiment of present disclosure.

FIG. 18 schematically shows a schematic structural diagram of a communication device 1800 according to an embodiment of present disclosure. The communication device may be a terminal such as a UE, a network device such as a base station, or a PCF network element and/or a NEF network element and/or an AF network element and/or an AMF network element and/or an SMF network element and/or a UPF network element. The communication device 1800 shown in FIG. 18 includes a processor 1810. The processor 1810 may invoke and execute a computer program from a memory to implement the method in embodiments of the present disclosure.

In some embodiments, as shown in FIG. 18, the communication device 1800 may further include a memory 1820. The processor 1810 may invoke and execute a computer program from the memory 1820 to implement the method in embodiments of the present disclosure.

The memory 1820 may be a separate device independent of the processor 1810 or may be integrated in the processor 1810.

In some embodiments, as shown in FIG. 18, the communication device 1800 may further include a transceiver 1830. The processor 1810 may control the transceiver 1830 to communicate with other devices. Specifically, information or data may be transmitted to or received from the other devices.

The transceiver 1830 may include a transmitter and a receiver. The transceiver 1830 may further include one or more antennas.

In some embodiments, the communication device 1800 may specifically be any network element in embodiments of the present disclosure, and the communication device 1800 may implement corresponding processes implemented by any network element in the various methods in embodiments of the present disclosure. Details are not described herein again for the sake of brevity.

In some embodiments, the communication device 1800 may specifically be a network device in embodiments of the present disclosure, and the communication device 1800 may implement corresponding processes implemented by the network device in the various methods in embodiments of the present disclosure. Details are not described herein again for the sake of brevity.

In some embodiments, the communication device 1800 may specifically be a mobile terminal/terminal in embodiments of the present disclosure, and the communication device 1800 may implement corresponding processes implemented by the mobile terminal/terminal in the various methods in embodiments of the present disclosure. Details are not described herein again for the sake of brevity.

The processor in embodiments of the present disclosure may be an integrated circuit chip having signal processing capabilities. In an implementation process, the steps in the above-mentioned method embodiments may be implemented using a hardware integrated logic circuit in the processor or instructions in a form of software.

The processor may be a general-purpose processor, a digital signal processor (DSP), an application specific integrated circuit (ASIC), a field programmable gate array (FPGA), or other programmable logic devices, discrete gate or transistor logic devices, and discrete hardware components. The methods, the steps, and logic block diagrams that are disclosed in embodiments of the present disclosure may be implemented or executed. The general-purpose processor may be a microprocessor, or the processor may be any conventional processor or the like. The steps of the method disclosed with reference to embodiments of the present disclosure may be directly executed and completed using a hardware decoding processor, or may be executed and completed using a combination of hardware and software modules in the decoding processor. The software module may be stored in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the method in combination with hardware thereof.

The memory in embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through exemplary but not restrictive description, RAMs in many forms, for example, a static RAM (SRAM), a dynamic RAM (DRAM), a synchronous DRAM (SDRAM), a double data rate SDRAM (DDRSDRAM), an enhanced SDRAM (ESDRAM), and a direct rambus RAM (DRRAM), are available. The memory in the system and method described in this specification includes, but is not limited to, these memories and memories of any other suitable types. The memory is described exemplarily but not restrictively.

Embodiments of the present disclosure further provide a computer-readable storage medium for storing a computer program.

In some embodiments, the computer-readable storage medium may be applied to a network device in embodiments of the present disclosure, and the computer program causes a computer to perform corresponding processes implemented by the network device in the various methods in embodiments of the present disclosure. Details are not described herein again for the sake of brevity.

In some embodiments, the computer-readable storage medium may be applied to any network element in embodiments of the present disclosure, and the computer program causes a computer to perform corresponding processes implemented by any network element in the various methods in embodiments of the present disclosure. Details are not described herein again for the sake of brevity.

In some embodiments, the computer-readable storage medium may be applied to a mobile terminal/terminal in embodiments of the present disclosure, and the computer program causes a computer to perform corresponding processes implemented by the mobile terminal/terminal in the various methods in embodiments of the present disclosure. Details are not described herein again for the sake of brevity.

Embodiments of the present disclosure further provide a computer program product, including computer program instructions.

In some embodiments, the computer program product may be applied to a network device in embodiments of the present disclosure, and the computer program instructions cause a computer to perform corresponding processes implemented by the network device in the various methods in embodiments of the present disclosure. Details are not described herein again for the sake of brevity.

In some embodiments, the computer program product may be applied to any network element in embodiments of the present disclosure, and the computer program instructions cause a computer to perform corresponding processes implemented by any network element in the various methods in embodiments of the present disclosure. Details are not described herein again for the sake of brevity.

In some embodiments, the computer program product may be applied to a mobile terminal/terminal in embodiments of the present disclosure, and the computer program instructions cause a computer to perform corresponding processes implemented by the mobile terminal/terminal in the various methods in embodiments of the present disclosure. Details are not described herein again for the sake of brevity.

Embodiments of the present disclosure further provide a computer program.

In some embodiments, the computer program may be applied to a network device in embodiments of the present disclosure. The computer program, when executed by a computer, causes the computer to perform corresponding processes implemented by the network device in the various methods in embodiments of the present disclosure. Details are not described herein again for the sake of brevity.

In some embodiments, the computer program may be applied to any network element in embodiments of the present disclosure. The computer program, when executed by a computer, causes the computer to perform corresponding processes implemented by any network element in the various methods in embodiments of the present disclosure. Details are not described herein again for the sake of brevity.

In some embodiments, the computer program may be applied to a mobile terminal/terminal in embodiments of the present disclosure. The computer program, when executed by a computer, causes the computer to perform corresponding processes implemented by the mobile terminal/terminal in the various methods in embodiments of the present disclosure. Details are not described herein again for the sake of brevity.

Those of ordinary skill in the art may notice that the exemplary units and algorithm steps described with reference to the embodiments disclosed in this specification can be implemented in electronic hardware, or a combination of computer software and electronic hardware. Whether the functions are executed in the manner of hardware or software depends on particular applications and design constraint conditions of the technical solutions. Those skilled in the art may use different methods to implement the described functions for each particular application, but it will not be considered that the implementation goes beyond the scope of the present disclosure.

Those skilled in the art may clearly understand that, for simple and clear description, for specific work processes of the above-described system, apparatus, and unit, reference may be made to corresponding processes in the foregoing method embodiments. Details are not described herein again.

In the several embodiments provided in the present disclosure, the disclosed system, apparatus, and method may be implemented in other manners. For example, the apparatus embodiments described above are merely examples. For example, division into the units is merely logical function division, and may be another division in an actual implementation. For example, multiple units or assemblies may be combined or may be integrated into another system, or some features may be ignored or not be performed.

The units described as separate components may or may not be physically separated, and components displayed as units may or may not be physical units, may be located in one position, or may be distributed over multiple network units. Some or all of the units may be selected based on actual requirements to achieve the objects of the solutions of this embodiment.

The term "unit" (and other similar terms such as module, etc.) refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

In addition, functional units in the embodiments of the present disclosure may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to execute all or some of the steps of the methods described in the embodiments of the present disclosure. The foregoing storage medium includes: any medium that may store program code, such as a USB flash drive, a removable hard disk, a read-only memory (ROM), a random access memory (RAM), a magnetic disk, or an optical disc.

The above descriptions are merely specific implementations of the present disclosure, but are not intended to limit the protection scope of the present disclosure. Any variation or replacement readily figured out by those skilled in the art within the technical scope disclosed in the present disclosure shall fall within the protection scope of the present disclosure. Therefore, the protection scope of the present disclosure shall be subject to the protection scope of the appended claims.

What is claimed is:

1. A data packet transmission method, the method being performed by a network device, and the method comprising:

obtaining quality of service profile information of a target service flow from a session management function network element, the quality of service profile information comprising a first data detection rule and a first processing rule, the first data detection rule comprising data packet set type internal identification information corresponding to at least one data packet set type of the target service flow and further comprising at least one of a data set sequence number of the data packet set type or a data packet sequence number within a data set of the data packet set type, the first processing rule comprising a processing rule corresponding to the data packet set type, and the processing rule corresponding to the data packet set type comprising packet loss processing information corresponding to the data packet set type;

receiving a data packet to be forwarded;

determining whether to discard one or more data packets within the data packet set type according to the packet loss processing information in response to the data packet set type internal identification information of the data packet being matched with the first data detection rule; and determining data packets to be discarded within the data packet set type in response to determining to discard one or more data packets.

2. The method according to claim 1, wherein the determining whether to discard one or more data packets within the data packet set type according to the packet loss processing information in response to the data packet set type internal identification information of the data packet being matched with the first data detection rule and determining data packets to be discarded within the data packet set type comprises:

determining whether to discard data packets within a data set of the data packet set type according to the packet loss processing information in response to the data packet set type internal identification information of the data packet being matched with the first data detection rule; and determining data packets to be discarded in the corresponding data set according to the packet loss processing information.

3. The method according to claim 1, wherein the processing rule corresponding to the data packet set type further comprises quality of service information corresponding to the data packet set type, and the method further comprising:

processing data packets within the data packet set type according to the quality of service information in response to the data packet set type internal identification information of the data packet being matched with the first data detection rule.

4. The method according to claim 3, wherein the processing the data packets within the data packet set type according to the quality of service information comprises:

processing data packets within a data set of the data packet set type according to the quality of service information in response to the data packet set type internal identification information of the data packet being matched with the first data detection rule.

5. A data packet transmission apparatus, comprising:

a memory operable to store computer-readable instructions; and a processor circuitry operable to read the computer-readable instructions, the processor circuitry when executing the computer-readable instructions is configured to:

obtain quality of service profile information of a target service flow from a session management function network element, the quality of service profile information comprising a first data detection rule and a first processing rule, the first data detection rule comprising data packet set type internal identification information corresponding to at least one data packet set type of the target service flow and further comprising at least one of a data set sequence number of the data packet set type or a data packet sequence number within a data set of the data packet set type, the first processing rule comprising a processing rule corresponding to the data packet set type, and the processing rule corresponding to the data packet set type comprising packet loss processing information corresponding to the data packet set type;

receive a data packet to be forwarded;

determine whether to discard one or more data packets within the data packet set type according to the packet loss processing information in response to the data packet set type internal identification information of the data packet being matched with the first data detection rule; and determine data packets to be discarded within the data packet set type in response to determining to discard one or more data packets.

6. The apparatus according to claim 5, wherein the first data detection rule further comprises at least one of a data set sequence number of the data packet set type or a data packet sequence number within a data set of the data packet set type.

7. The apparatus according to claim 5, wherein the processor circuitry is configured to:

determine whether to discard data packets within a data set of the data packet set type according to the packet loss processing information in response to the data packet set type internal identification information of the data packet being matched with the first data detection rule; and determine data packets to be discarded in the corresponding data set according to the packet loss processing information.

8. The apparatus according to claim 5, wherein the processor circuitry is configured to:

process data packets within the data packet set type according to the quality of service information in response to the data packet set type internal identification information of the data packet being matched with the first data detection rule.

9. The apparatus according to claim 5, wherein the processor circuitry is configured to:

process data packets within a data set of the data packet set type according to the quality of service information in response to the data packet set type internal identification information of the data packet being matched with the first data detection rule.

10. A non-transitory machine-readable media, having instructions stored on the machine-readable media, the instructions configured to, when executed, cause a machine to:

obtain quality of service profile information of a target service flow from a session management function network element, the quality of service profile information comprising a first data detection rule and a first processing rule, the first data detection rule comprising data packet set type internal identification information corresponding to at least one data packet set type of the target service flow, the first processing rule comprising a processing rule corresponding to the data packet set type and further comprising at least one of a data set sequence number of the data packet set type or a data packet sequence number within a data set of the data packet set type, and the processing rule corresponding to the data packet set type comprising packet loss processing information corresponding to the data packet set type;

receive a data packet to be forwarded;

determine whether to discard one or more data packets within the data packet set type according to the packet loss processing information in response to the data packet set type internal identification information of the data packet being matched with the first data detection rule; and determine data packets to be discarded within the data packet set type in response to determining to discard one or more data packets.

11. The media according to claim 10, wherein the first data detection rule further comprises at least one of a data set sequence number of the data packet set type or a data packet sequence number within a data set of the data packet set type.

12. The media according to claim 10, wherein the instructions is configured to cause the machine to:

determine whether to discard data packets within a data set of the data packet set type according to the packet loss processing information in response to the data packet set type internal identification information of the data packet being matched with the first data detection rule; and determine data packets to be discarded in the corresponding data set according to the packet loss processing information.

13. The media according to claim 10, wherein the instructions is configured to cause the machine to:

process data packets within the data packet set type according to the quality of service information in response to the data packet set type internal identification information of the data packet being matched with the first data detection rule.

14. The media according to claim 13, wherein the instructions is configured to cause the machine to:

process data packets within a data set of the data packet set type according to the quality of service information in response to the data packet set type internal identification information of the data packet being matched with the first data detection rule.

* * * * *